(12) United States Patent
Shimoshikiryo

(10) Patent No.: US 7,283,192 B2
(45) Date of Patent: Oct. 16, 2007

(54) LIQUID CRYSTAL DISPLAY

(75) Inventor: Fumikazu Shimoshikiryo, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/407,253

(22) Filed: Apr. 20, 2006

(65) Prior Publication Data

US 2006/0256271 A1     Nov. 16, 2006

Related U.S. Application Data

(60) Continuation of application No. 11/130,261, filed on May 17, 2005, now Pat. No. 7,079,214, which is a division of application No. 10/455,440, filed on Jun. 6, 2003, now Pat. No. 6,958,791.

(30) Foreign Application Priority Data

| Jun. 6, 2002 | (JP) | ............................. 2002-165185 |
| Apr. 9, 2003 | (JP) | ............................. 2003-105334 |

(51) Int. Cl.
   *G02F 1/1343* (2006.01)
(52) U.S. Cl. ...................... 349/144; 349/129
(58) Field of Classification Search ................ 349/144, 349/129
   See application file for complete search history.

(56) References Cited

U.S. PATENT DOCUMENTS

| 4,345,249 | A | 8/1982 | Togashi |
| 5,610,739 | A | 3/1997 | Uno et al. |
| 5,818,407 | A | 10/1998 | Hori et al. |
| 6,137,556 | A | 10/2000 | Yamahara |
| 6,215,543 | B1 | 4/2001 | Mason et al. |
| 6,573,879 | B2 | 6/2003 | Taniguchi et al. |
| 6,704,086 | B1 | 3/2004 | Dubal et al. |
| 6,791,640 | B1 | 9/2004 | Okamoto et al. |
| 7,084,848 | B2 * | 8/2006 | Senda et al. ................... 345/92 |
| 2001/0006410 | A1 | 7/2001 | Yamada et al. |
| 2001/0024257 | A1 | 9/2001 | Kubo et al. |
| 2002/0097362 | A1 | 7/2002 | Yamada et al. |

FOREIGN PATENT DOCUMENTS

| EP | 1 113 312 | 7/2001 |
| JP | 8-201777 | 8/1996 |
| JP | 9-113933 | 5/1997 |
| KR | 218584 | 9/1999 |

* cited by examiner

*Primary Examiner*—David Nelms
*Assistant Examiner*—David Y. Chung
(74) *Attorney, Agent, or Firm*—Harness, Dickey & Pierce, P.L.C.

(57) ABSTRACT

To reduce viewing angle dependence of γ characteristics in a normally black liquid crystal display.

Each pixel 10 has a first sub-pixel 10a and a second sub-pixel 10b which can apply mutually different voltages to their respective liquid crystal layers. Relationships $\Delta V12 (gk) > 0$ volts and $\Delta V12 (gk) \geq \Delta V12 (gk+1)$ are satisfied at least in a range $0 < gk \leq n-1$ if it is assumed that $\Delta V12 = V1 - V2$, where $\Delta V12$ is the difference between root-mean-square voltage V1 applied to the liquid crystal layer of the first sub-pixel 10a and root-mean-square voltage V2 applied to the liquid crystal layer of the second sub-pixel 10b.

11 Claims, 19 Drawing Sheets

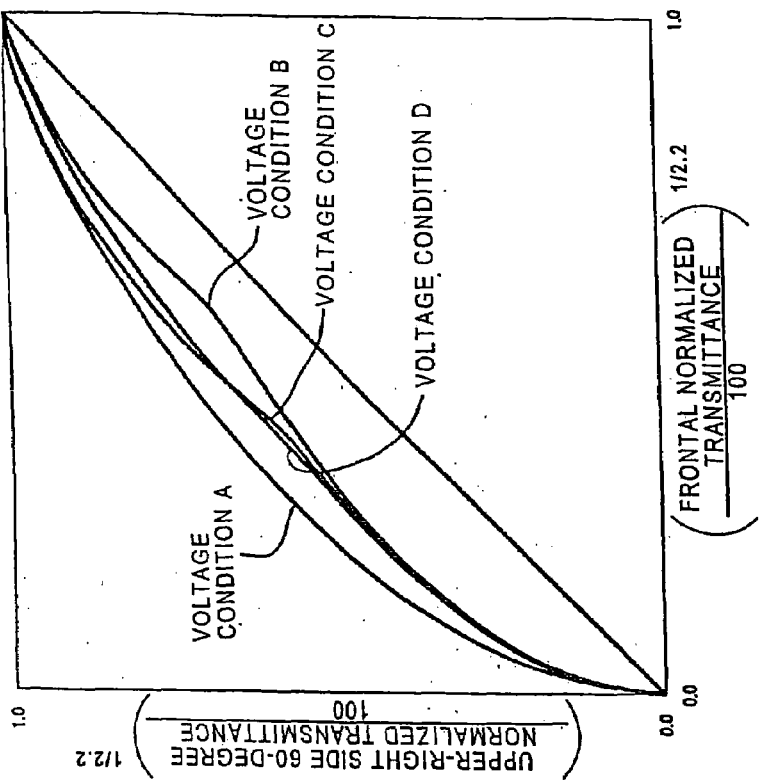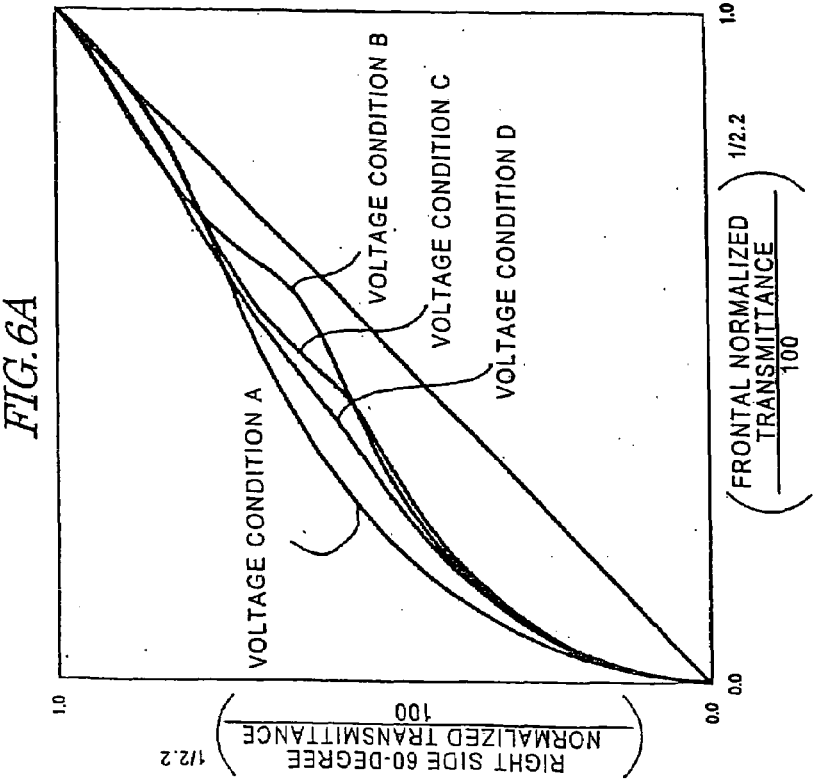

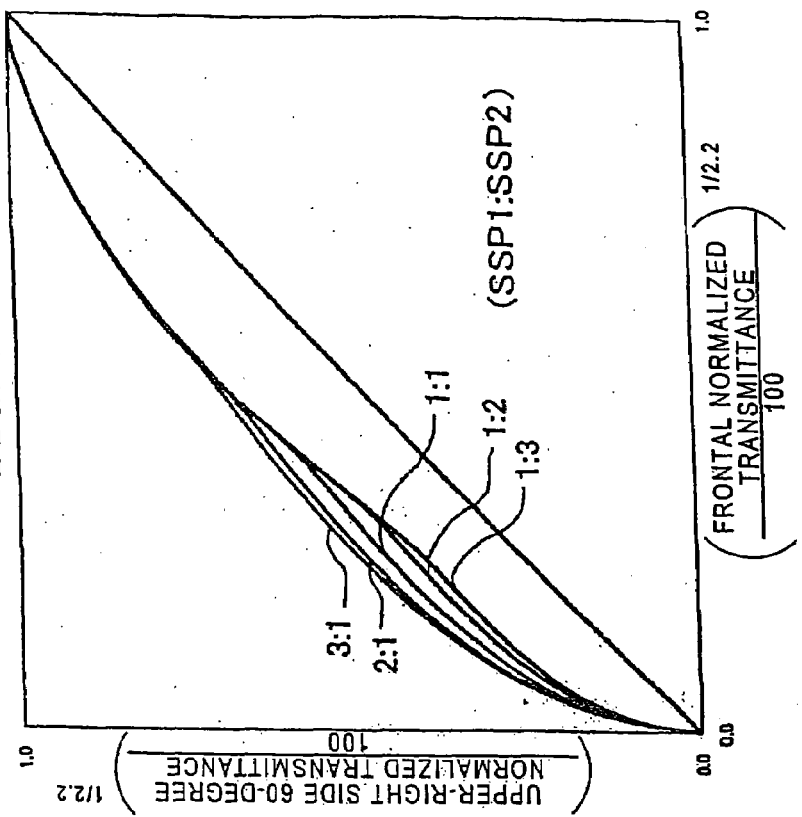
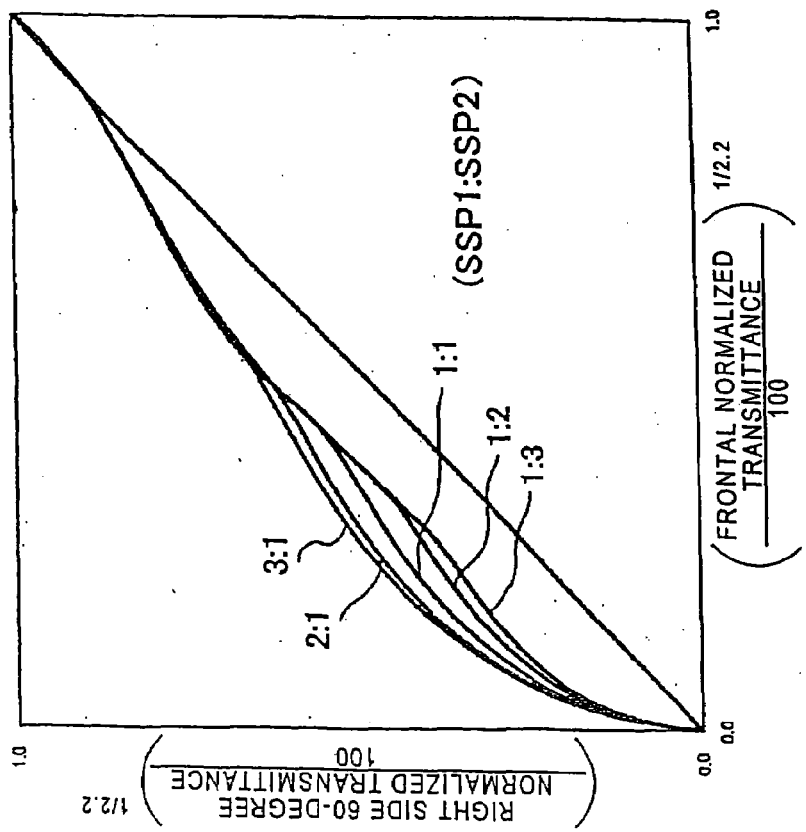

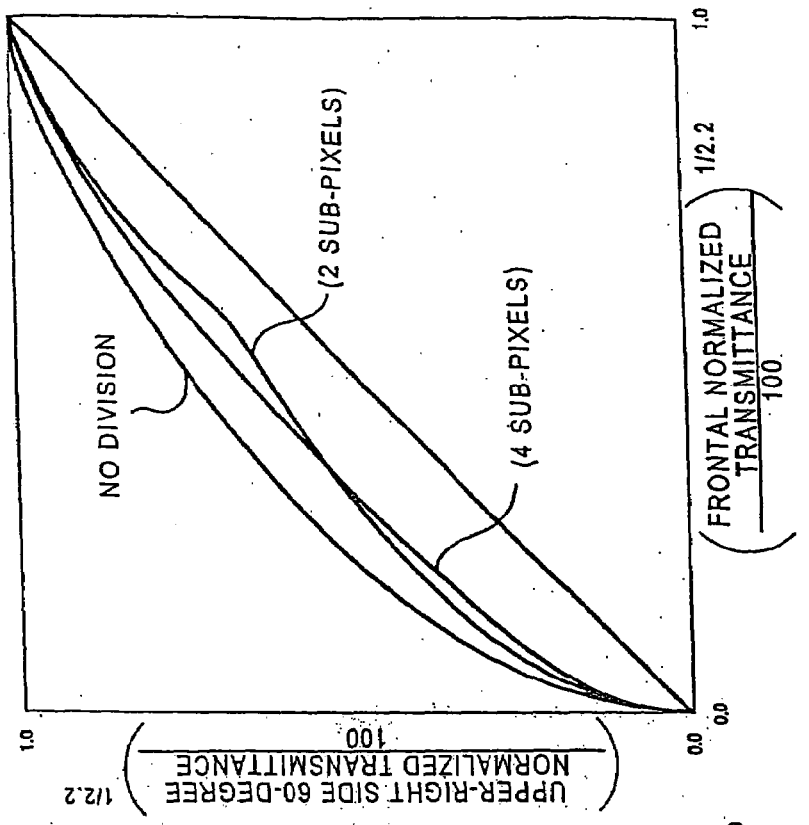
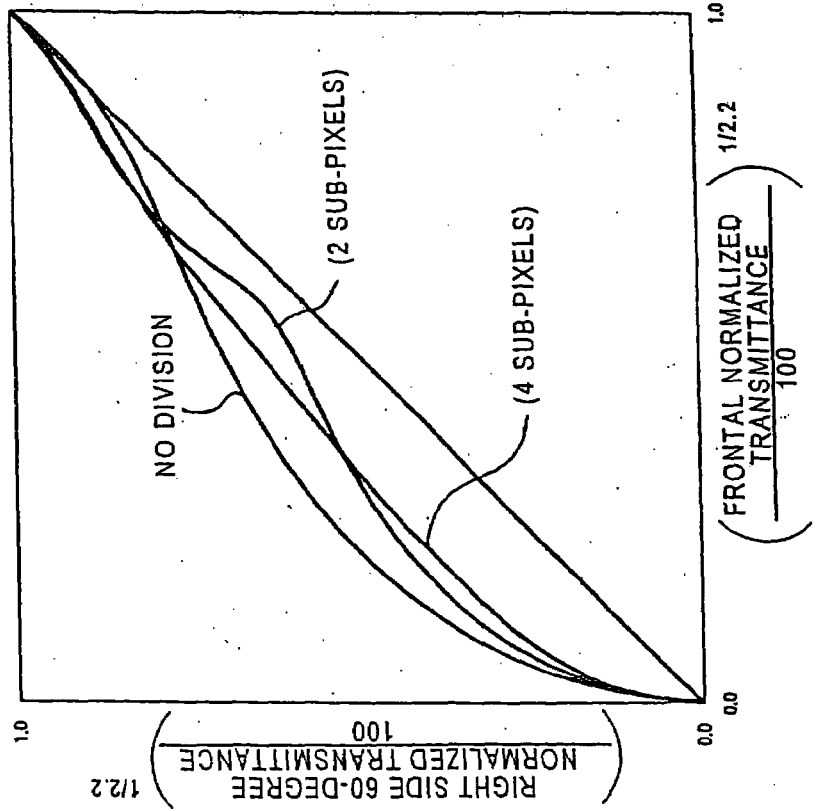

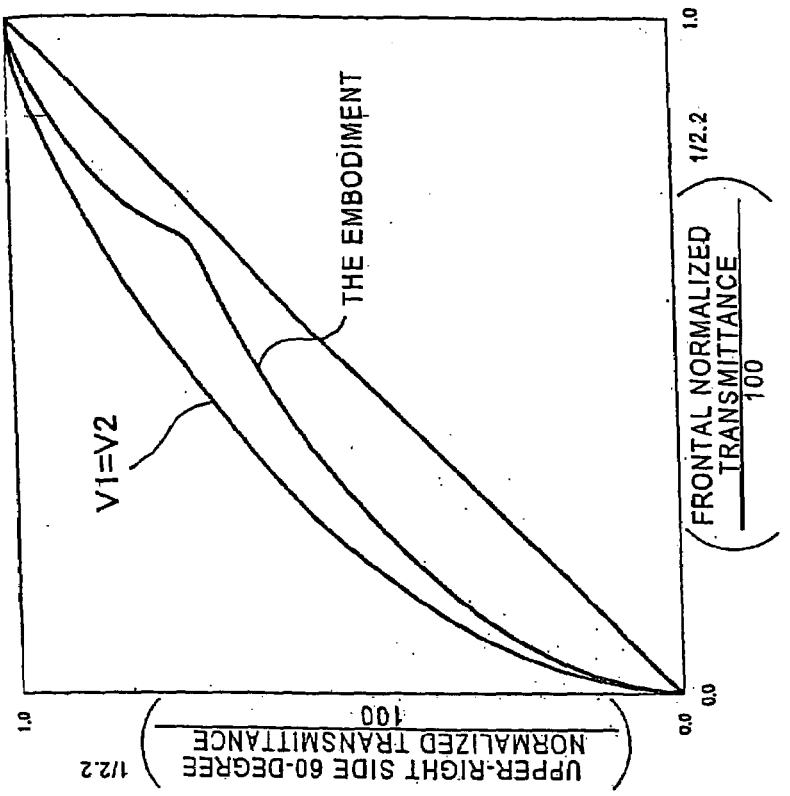
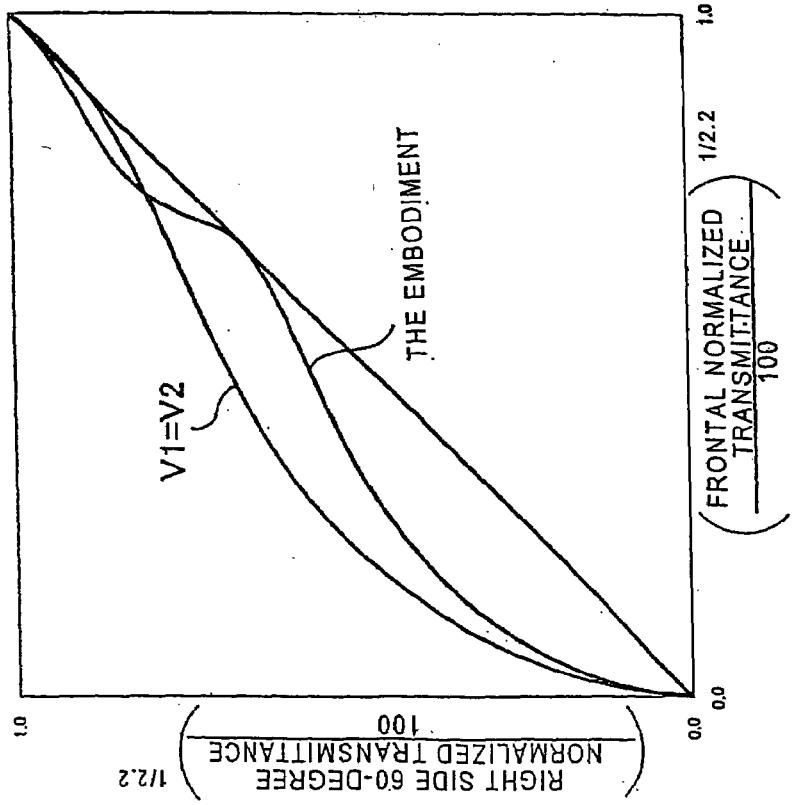

LIQUID CRYSTAL DISPLAY

DESCRIPTION OF RELATED APPLICATIONS

The present application is a continuation of prior U.S. application Ser. No. 11/130,261 filed on May 17, 2005 now U.S. Pat. No. 7,079,214, which is a divisional of prior U.S. application Ser. No. 10/455,440 filed on Jun. 6, 2003 (now U.S. Pat. No. 6,958,791, issued Oct. 25, 2005), which claims priority under 35 U.S.C. § 119 to Japanese Application Numbers 2002-165185 filed Jun. 6, 2002 and 2003-105334 filed Apr. 9, 2003, the entire contents of which is hereby incorporated herein by reference.

BACKGROUND OF THE INVENTION

1. Field of the Invention

The present invention relates to a structure and/or drive method which can reduce viewing angle dependence of $\gamma$ characteristics in a liquid crystal display.

2. Description of the Related Art

Liquid crystal displays are flat-panel displays which have excellent features including high resolution, small thickness, light weight, and low power consumption. Their market size has expanded recently with improvements in display performance and production capacity as well as improvements in price competitiveness against other types of display device.

Twisted nematic (TN) liquid crystal displays which have conventionally been in common use have liquid crystal molecules with positive dielectric anisotropy placed between upper and lower substrates in such a way that their long axis are oriented approximately parallel to substrate surfaces and twisted 90 degrees along the thickness of a liquid crystal layer. When a voltage is applied to the liquid crystal layer, the liquid crystal molecules rise parallel to the electric field, releasing the twisted alignment. The TN liquid crystal display controls transmitted light quantity using changes in rotary polarization resulting from the orientation changes of the liquid crystal molecules caused by voltage.

The TN liquid crystal display allows wide manufacturing margins and high productivity. On the other hand, it has problems with display performance, especially with viewing angle characteristics. Specifically, when the display surface of the TN liquid crystal display is viewed obliquely, the display contrast ratio lowers considerably. Consequently, even if an image clearly presents a plurality of grayscales from black to white when viewed from the front, brightness differences between grayscales appear very unclear when the image is viewed obliquely. Besides, the phenomenon (so-called grayscale reversal) that a portion which appears dark when viewed from the front appears brighter when viewed obliquely also presents a problem.

To improve the viewing angle characteristics of the TN liquid crystal display, some liquid crystal displays have been developed recently, including an in-plane switching (IPS) liquid crystal display described in Japanese Patent Publication No. 63-21907, a multi-domain vertically aligned (MVA) liquid crystal display described in Japanese Patent Laid-Open No. 11-242225, an Axial Symmetric Micro-cell (ASM) display described in Japanese Patent Laid-Open No. 10-186330, and a liquid crystal display described in Japanese Patent Laid-Open No. 2002-55343.

Liquid crystal displays employing any of the novel modes described above (wide viewing angle modes) solve the concrete problems with viewing angle characteristics. Specifically they are free of the problems that the display contrast ratio lowers considerably or display grayscales are reversed when the display surface of the TN liquid crystal display is viewed obliquely.

Under circumstances where display quality of liquid crystal displays continues to be improved, a new problem with viewing angle characteristics have surfaced, namely, viewing angle dependence of $\gamma$ characteristics, meaning that $\gamma$ characteristics differ between when the display is viewed from the front and when the display is viewed obliquely. This presents a problem, especially when displaying images such as photographs or displaying television broadcasts and the like.

The viewing angle dependence of $\gamma$ characteristics is more prominent in MVA mode and ASM mode than in IPS mode. On the other hand, it is more difficult to produce IPS panels which provide a high contrast ratio when viewed from the front with high productivity than MVA or ASM panels. Thus, it is desired to reduce the viewing angle dependence of $\gamma$ characteristics in MVA mode or ASM mode.

The present invention has been made in view of the above points. Its main object is to provide a liquid crystal display with reduced viewing angle dependence of $\gamma$ characteristics.

SUMMARY OF THE INVENTION

To achieve the above object, a first aspect of the present invention provides a liquid crystal display used in normally black mode, comprising a plurality of pixels each of which has a liquid crystal layer and a plurality of electrodes for applying voltage to the liquid crystal layer, wherein: each of the plurality of pixels comprises a first sub-pixel and a second sub-pixel which can apply mutually different voltages to their respective liquid crystal layers; and when each of the plurality of pixels displays a grayscale gk which satisfies $0 \leq gk \leq n$, where gk and n are integers not less than zero and a larger value of gk corresponds to higher brightness, relationships $\Delta V12$ (gk)>0 volts and $\Delta V12$ (gk) $\geq \Delta V12$ (gk+1) are satisfied at least in a range $0<gk \leq n-1$ if it is assumed that $\Delta V12$ (gk)=V1 (gk)−V2 (gk), where V1 (gk) and V2 (gk) are root-mean-square voltages applied to the liquid crystal layers of the first sub-pixel and the second sub-pixel, respectively.

The liquid crystal display may be configured such that: each of the plurality of pixels comprises a third sub-pixel which can apply a voltage different from those of the first sub-pixel and the second sub-pixel to its liquid crystal layer; and when each of the plurality of pixels displays a grayscale gk and $\Delta V13$ (gk)=V1 (gk)−V3 (gk), a relationship 0 volts<$\Delta V13$ (gk)<$\Delta V12$ (gk) is satisfied if the root-mean-square voltage applied to the liquid crystal layer of the third sub-pixel is V3 (gk).

Preferably, the root-mean-square voltages applied to the liquid crystal layers satisfy a relationship $\Delta V12$ (gk)>$\Delta V12$ (gk+1) at least in a range $0<gk \leq n-1$.

Preferably, relationships $\Delta V12$ (gk)$\geq \Delta V12$ (gk+1) and $\Delta V13$ (gk)$\geq \Delta V13$ (gk+1) are satisfied at least in a range $0<gk \leq n-1$ when each pixel has a third sub-pixel.

In a preferred embodiment, the first sub-pixel and the second sub-pixel each comprise: a liquid crystal capacitor formed by a counter electrode and a sub-pixel electrode opposing the counter electrode via the liquid crystal layer, and a storage capacitor formed by a storage capacitor electrode connected electrically to the sub-pixel electrode, an insulating layer, and a storage capacitor counter electrode opposing the storage capacitor electrode via the insulating layer; and the counter electrode is a single electrode shared by the first sub-pixel and the second sub-pixel, and the storage capacitor counter electrodes of the first sub-pixel and the second sub-pixel are electrically independent of each other. Typically, the counter electrode is provided on a counter substrate (sometimes referred to as a "common electrode"), but in IPS mode, it is provided on the same substrate as the sub-pixel electrode. Incidentally, "the counter electrode opposing a sub-pixel electrode via the liquid crystal layer" need not necessarily oppose the sub-pixel electrode across the thickness of the liquid crystal layer. In an IPS liquid crystal display, it is placed within the liquid crystal layer in opposing relation to the sub-pixel electrode across the liquid crystal layer.

In a preferred embodiment, the liquid crystal display comprises two switching elements provided for the first sub-pixel and the second sub-pixel, respectively, wherein the two switching elements are turned on and off by scan line signal voltages supplied to a common scan line; display signal voltages are applied to the respective sub-pixel electrodes and storage capacitor electrodes of the first sub-pixel and the second sub-pixel from a common signal line when the two switching elements are on; voltages of the respective storage capacitor counter electrodes of the first sub-pixel and the second sub-pixel change after the two switching elements are turned off; and the amounts of change defined by the direction and magnitude of the change differ between the first sub-pixel and the second sub-pixel. The amounts of change in the storage capacitor counter electrodes are defined here not only in terms of magnitude (absolute value), but also in terms of direction. For example, the amounts of change in the voltages of the storage capacitor counter electrodes of the first sub-pixel and the second sub-pixel may be equal in absolute value and differ in sign. In short, if voltage rises in one of the storage capacitor counter electrodes and falls in the other storage capacitor counter electrode after the switching element is turned off, the absolute values of the changes may be equal.

Preferably, the liquid crystal layer is a vertically aligned liquid crystal layer and contains nematic liquid crystal material with negative dielectric anisotropy.

Preferably, the liquid crystal layers of the first sub-pixel and the second sub-pixel each contain four domains which are approximately 90 degrees apart in azimuth direction in which their liquid crystal molecules incline when a voltage is applied.

Preferably, the first sub-pixel and the second sub-pixel are placed on opposite sides of the common signal line; the first sub-pixel and the second sub-pixel each have, on the counter electrode side, a plurality of ribs protruding towards the liquid crystal layer and the plurality of ribs include a first rib extending in a first direction and a second rib extending in a second direction approximately orthogonal to the first direction; and the first rib and the second rib are placed symmetrically with respect to a center line parallel to the common scan line in each of the first sub-pixel and the second sub-pixel and the arrangement of the first rib and the second rib in one of the first and second sub-pixels is symmetrical with respect to the arrangement of the first rib and the second rib in the other sub-pixel.

Preferably, the center line parallel to the common scan line in each of the first sub-pixel and the second sub-pixel is placed at an interval equal to approximately one half of an array pitch of the scan lines in both the first sub-pixel and the second sub-pixel.

Preferably, the area of the first sub-pixel is equal to or smaller than the area of the second sub-pixel. When each of the plurality of pixels has three or more sub-pixels, preferably the area of the sub-pixel to which the highest root-mean-square voltage is applied is not larger than the areas of the other sub-pixels.

In a liquid crystal display according to another aspect of the present invention: direction of the electric field applied to the liquid crystal layers in the plurality of pixels is reversed every vertical scanning period; and when displaying an intermediate grayscale, the direction of the electric field is reversed periodically in the row direction in the case of pixels in an arbitrary row and it is reversed every pixel in the column direction in the case of pixels in an arbitrary column.

According to one embodiment, the direction of the electric field is reversed every pixel in the row direction in the case of pixels in an arbitrary row.

According to one embodiment, the direction of the electric field is reversed every two pixels in the row direction in the case of pixels in an arbitrary row.

A liquid crystal display according to one embodiment, operates in normally black mode; wherein the at least two sub-pixels include two sub-pixels SPa (p, q) and SPb (p, q); and when each of the plurality of pixels displays a grayscale gk which satisfies $0 \leq gk \leq n$, where gk and n are integers not less than zero and a larger value of gk corresponds to higher brightness, relationships $\Delta V12$ (gk)>0 volts and $\Delta V12$ (gk)$\geq \Delta V12$ (gk+1) are satisfied at least in a range $0<gk \leq n-1$ if it is assumed that $\Delta V12$ (gk)=V1 (gk)−V2 (gk), where V1 (gk) and V2 (gk) are root-mean-square voltages applied to the liquid crystal layers of the first sub-pixel and the second sub-pixel, respectively.

According to one embodiment, a relationship $\Delta V12$ (gk)$\geq \Delta V12$ (gk+1) is satisfied at least in a range $0<gk \leq n-1$.

According to one embodiment, SPa (p, q) and SPb (p, q) each comprise: a liquid crystal capacitor formed by a counter electrode and a sub-pixel electrode opposing the counter electrode via the liquid crystal layer, and a storage capacitor formed by a storage capacitor electrode connected electrically to the sub-pixel electrode, an insulating layer, and a storage capacitor counter electrode opposing the storage capacitor electrode via the insulating layer; and the counter electrode is a single electrode shared by SPa (p, q) and SPb (p, q), and the storage capacitor counter electrodes of SPa (p, q) and SPb (p, q) are electrically independent of each other.

According to one embodiment, the liquid crystal display comprises two switching elements provided for SPa (p, q) and SPb (p, q), respectively, wherein the two switching elements are turned on and off by scan line signal voltages supplied to a common scan line; display signal voltages are applied to the respective sub-pixel electrodes and storage capacitor electrodes of SPa (p, q) and SPb (p, q) from a common signal line when the two switching elements are on; voltages of the respective storage capacitor counter electrodes of SPa (p, q) and SPb (p, q) change after the two switching elements are turned off; and the amounts of change defined by the direction and magnitude of the change differ between SPa (p, q) and SPb (p, q). Specifically, when the two switching elements are on, voltages are applied to the respective storage capacitor counter electrodes of VSpa (on) and VSpb (on) such that when the two switching elements are turned off, potentials of the respective storage capacitor counter electrodes will change, for example, from VSpa (on) and VSpb (on) to VSpa (off) and VSpb (off), respectively, and that the respective amounts of change "VSpa (off)−VSpa (on)" and "VSpb (off)−VSpb (on)" will be mutually different.

According to one embodiment, the changes in the voltages of the storage capacitor counter electrodes of SPa (p, q) and SPb (p, q) are equal in amount and opposite in direction.

According to one embodiment, the voltages of the storage capacitor counter electrodes of SPa (p, q) and SPb (p, q) are oscillating voltages 180 degrees out of phase with each other. The oscillating voltages may be rectangular waves, sine waves, or triangular waves.

According to one embodiment, the oscillating voltages of the storage capacitor counter electrodes of SPa (p, q) and SPb (p, q) each have a period approximately equal to one horizontal scanning period.

According to one embodiment, the oscillating voltages of the storage capacitor counter electrodes of SPa (p, q) and SPb (p, q) each have a period shorter than one horizontal scanning period.

According to one embodiment, the oscillating voltages of the storage capacitor counter electrodes of SPa (p, q) and SPb (p, q) are approximately equal within any horizontal scanning period if averaged over the period.

According to one embodiment, the period of the oscillation is one-half of one horizontal scanning period.

According to one embodiment, the oscillating voltages are rectangular waves with a duty ratio of 1:1.

According to one embodiment, SPa (p, q) and SPb (p, q) have different areas, of which the smaller area belongs to SPa (p, q) or SPb (p, q) whichever has a larger root-mean-square voltage applied to its liquid crystal layer.

According to one embodiment, the area of SPa (p, q) and area of SPb (p, q) are practically equal.

BRIEF DESCRIPTION OF THE DRAWINGS

FIG. 4A is a graph showing dependence of transmittance on applied voltage, FIG. 4B is a diagram showing transmittances in FIG. 4A after being normalized with respect to transmittance in white mode, and FIG. 4C is a diagram showing y characteristics.

FIGS. 6A to 6B are graphs showing γ characteristics obtained under voltage conditions A to D, shown in FIG. 5, where FIG. 6A shows right side 60-degree viewing γ characteristics and FIG. 6B shows upper-right side 60-degree viewing γ characteristics.

FIGS. 8A to 8B are graphs illustrating effects of area ratios between sub-pixels on γ characteristics under voltage condition C according to the embodiment of the present invention, where FIG. 8A shows right side 60-degree viewing γ characteristics and FIG. 6B shows upper-right side 60-degree viewing γ characteristics.

FIGS. 10A to 10B are diagrams illustrating effects of sub-pixel counts on γ characteristics under voltage condition B according to the embodiment of the present invention, where FIG. 10A shows right side 60-degree viewing γ characteristics and FIG. 10B shows upper-right side 60-degree viewing γ characteristics.

FIGS. 16A to 16B are diagrams showing γ characteristics of the liquid crystal display 200, where FIG. 16A shows right side 60-degree viewing γ characteristics and FIG. 16B shows upper-right side 60-degree viewing γ characteristics.

FIG. 17 is a diagram schematically showing a pixel arrangement of a liquid crystal display according to a second aspect of the present invention.

FIG. 19 is a diagram schematically showing a pixel arrangement of a liquid crystal display according to another embodiment of the present invention.

DETAILED DESCRIPTION OF THE PREFERRED EMBODIMENTS

Configuration and operation of liquid crystal displays according to embodiments in a first aspect of the present invention will be described below with reference to drawings.

Figure 1:
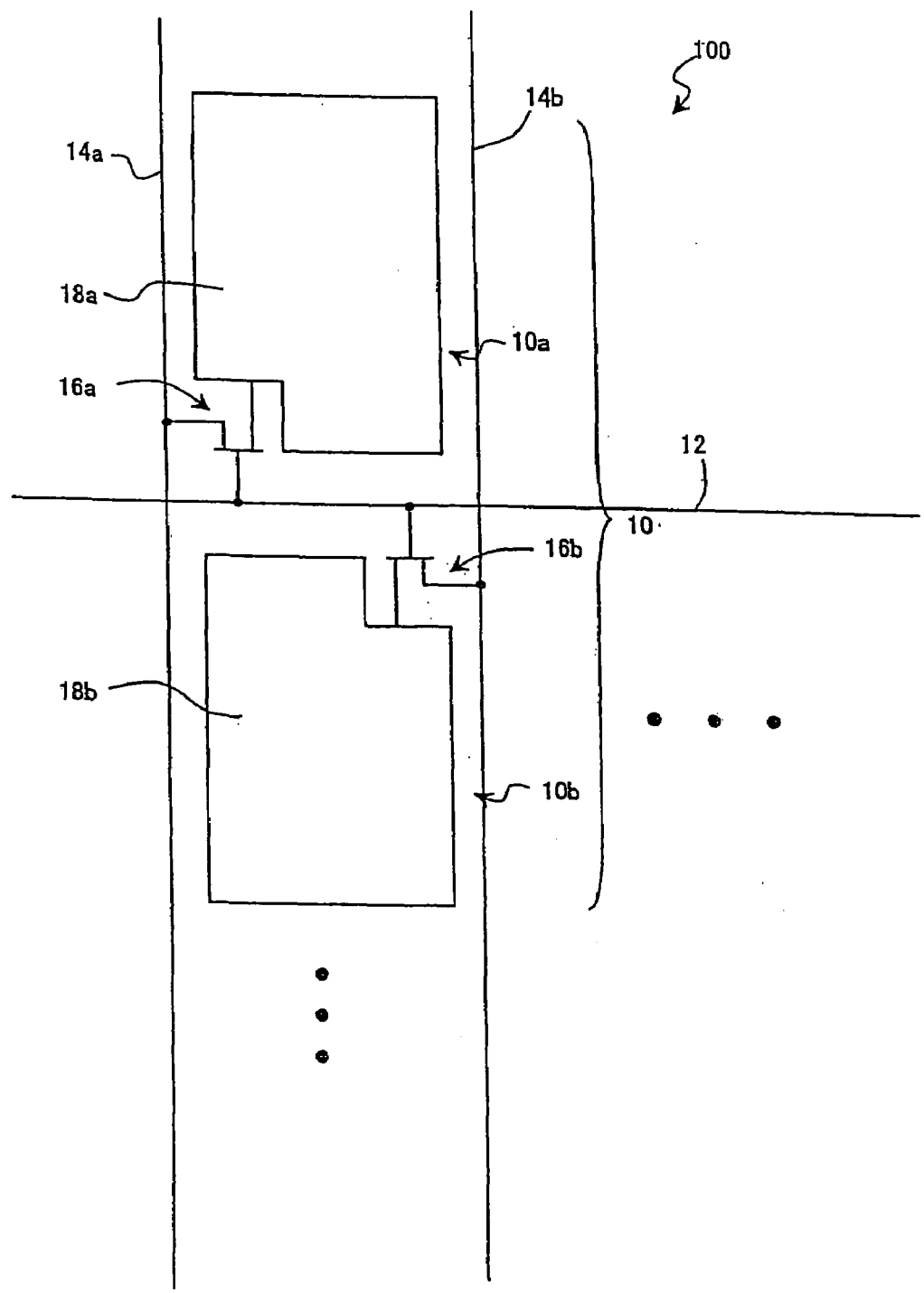
FIG. 1 is a diagram schematically showing a pixel configuration of a liquid crystal display 100 according to an embodiment in a first aspect of the present invention.
Figure 2A:
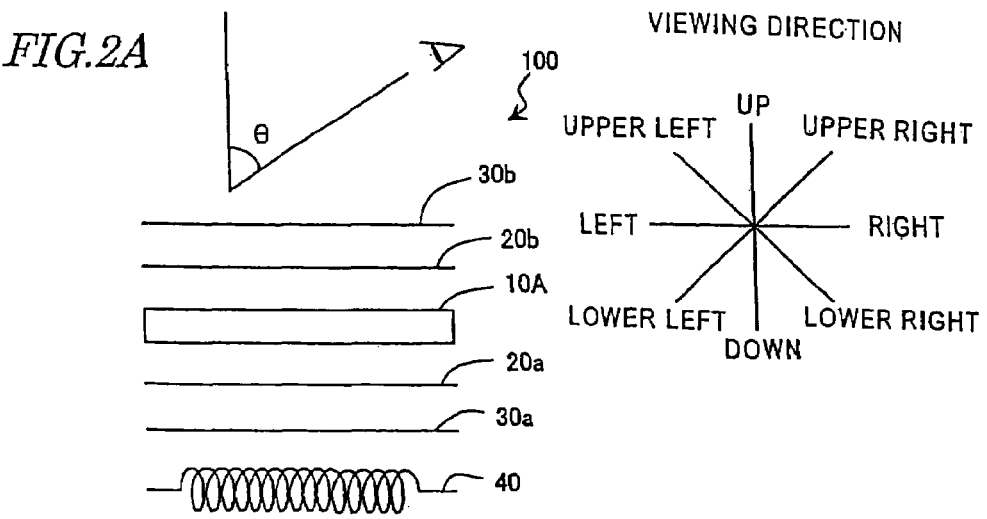
FIGS. 2A to 2C are schematic diagrams showing a structure of a liquid crystal display according to the embodiment of the present invention.
Figure 2B:
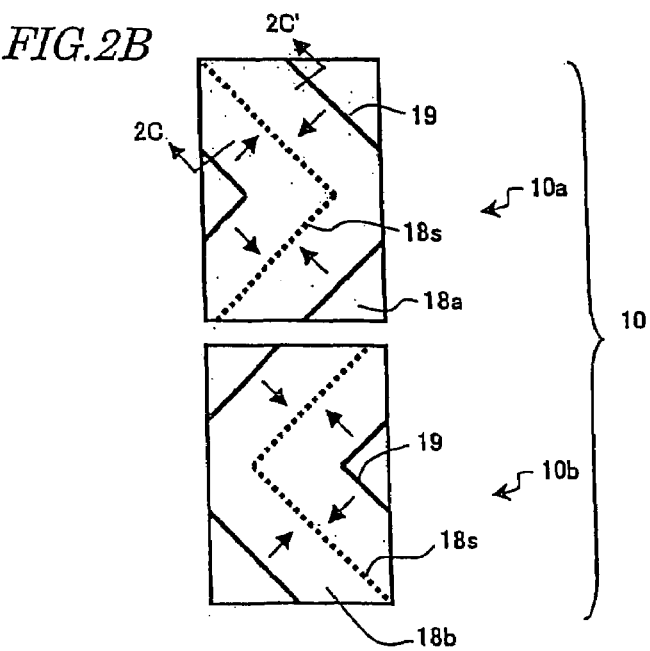
Figure 2C:
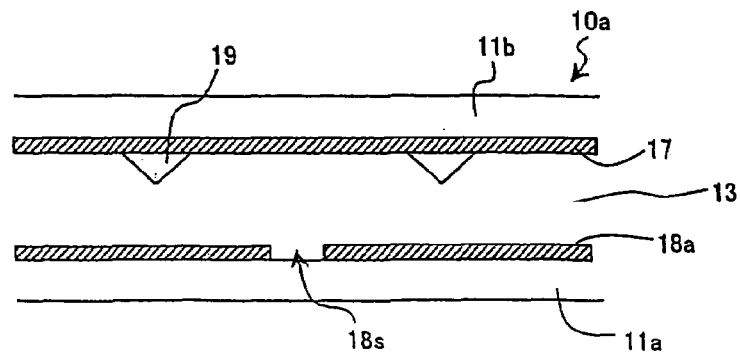
Figure 3A:
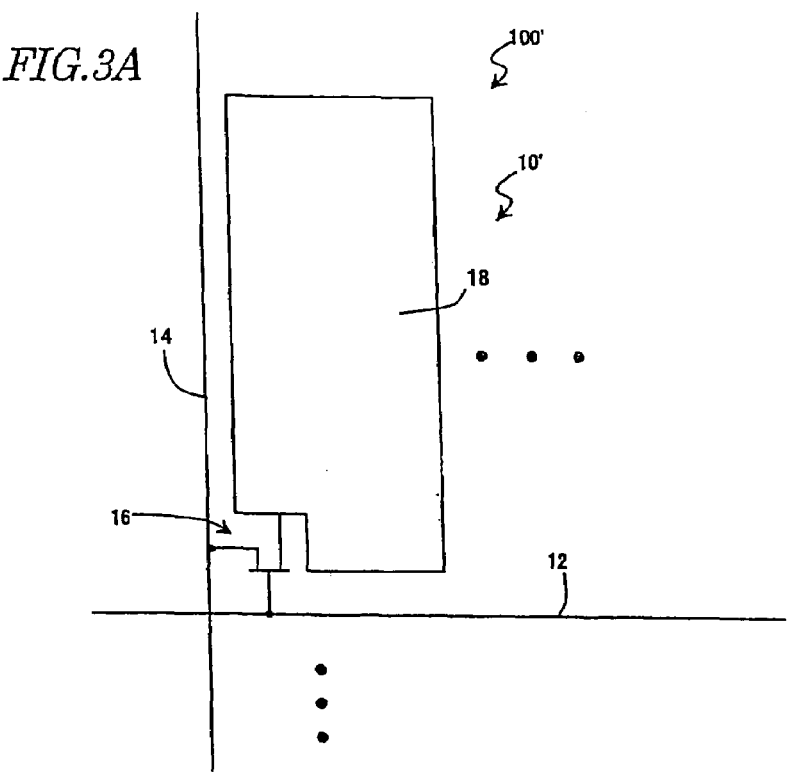
FIGS. 3A to 3C are diagrams schematically showing a structure of a conventional liquid crystal display 100'.
Figure 3B:
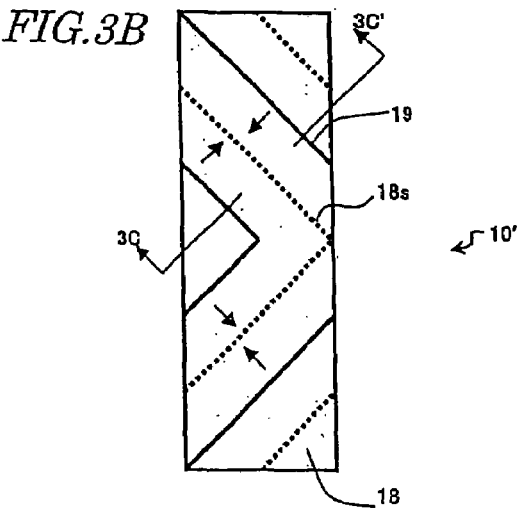
Figure 3C:
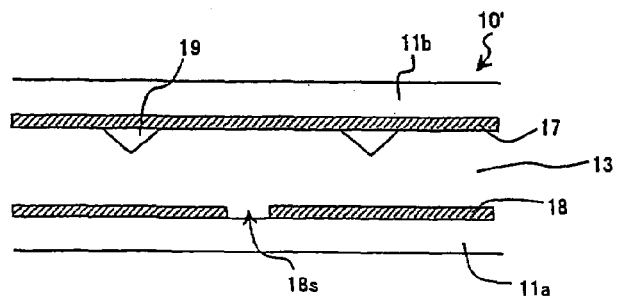

First, refer to FIGS. 1, 2A, 2B, and 2C. FIG. 1 is a diagram schematically showing an electrode arrangement in a pixel of a liquid crystal display 100 according to an embodiment of the present invention. FIG. 2A is a diagram schematically showing an overall configuration of the liquid crystal display 100, FIG. 2B is a diagram schematically showing an electrode structure in a pixel, FIG. 2C is a sectional view taken along a line 2C–2C' in FIG. 2B. For the purpose of reference, an electrode arrangement in a pixel of a conventional liquid crystal display 100', its electrode structure, and a sectional view taken along a line 3C–3C' are shown schematically in FIGS. 3A, 3B, and 3C, respectively.

The liquid crystal display 100 according to this embodiment operates in normally black mode and comprises a plurality of pixels each of which has a liquid crystal layer and a plurality of electrodes for applying voltage to the liquid crystal layer. Although a TFT liquid crystal display is taken as an example here, other switching elements (e.g., MIM elements) may be used instead.

The liquid crystal display 100 has a plurality of pixels 10 arranged in a matrix. Each of the plurality of pixels 10 has a liquid crystal layer 13. Also, the pixels have their own pixel electrode 18 and a counter electrode 17 to apply voltage to the liquid crystal layer 13. Typically, the counter electrode 17 is a single electrode common to all the pixels 10.

In the liquid crystal display 100 according to this embodiment, each of the plurality of pixels 10 has a first sub-pixel 10a and second sub-pixel 10b which can apply mutually different voltages, as shown in FIG. 1.

When displaying a grayscale gk which satisfies $0 \leq gk \leq n$ (where gk and n are integers not less than zero and a larger value of gk corresponds to higher brightness), each of the plurality of pixels is driven in such a way as to satisfy relationships $\Delta V12$ (gk)>0 volts and $\Delta V12$ (gk)$\geq \Delta V12$ (gk+1) at least in a range $0<gk \leq n-1$, where $\Delta V12$ (gk)=V1 (gk)–V2 (gk) is the difference between root-mean-square voltage V1 (gk) applied to the liquid crystal layer of the first sub-pixel 10a and root-mean-square voltage V2 (gk) applied to the liquid crystal layer of the second sub-pixel 10b.

The number of sub-pixels (sometimes referred to as the number of pixel divisions) possessed by each pixel 10 it not limited to two. Each pixel 10 may further have a third sub-pixel (not shown) to which a voltage different from those applied to the first sub-pixel 10a and second sub-pixel 10b may be applied. In that case, the pixel is configured such that a relationship 0 volts<$\Delta V13$ (gk)<$\Delta V12$ (gk) is satisfied if it is assumed $\Delta V13$ (gk)=V1 (gk)–V3 (gk), where V3 (gk) is an root-mean-square voltage applied to the liquid crystal layer of the third sub-pixel and $\Delta V13$ (gk) is the difference between the root-mean-square voltage applied to the liquid crystal layer of the first sub-pixel and the root-mean-square voltage applied to the liquid crystal layer of the third sub-pixel. Of course, each pixel 10 may have four or more sub-pixels.

Preferably, the root-mean-square voltages applied to the liquid crystal layers of the sub-pixels satisfy a relationship $\Delta V12$ (gk)>$\Delta V12$ (gk+1) at least in a range $0<gk \leq n-1$. Thus, it is preferable that as the grayscale level gets higher, the difference between the root-mean-square voltages applied to the liquid crystal layers of the first sub-pixel 10a and second sub-pixel 10b becomes smaller. In other words, it is preferable that as the grayscale level gets lower (closer to black), the difference between the root-mean-square voltages applied to the liquid crystal layers of the first sub-pixel 10a and second sub-pixel 10b becomes larger. Also, preferably relationships $\Delta V12$ (gk)>$\Delta V12$ (gk+1) and $\Delta V13$ (gk)>$\Delta V13$ (gk+1) are satisfied at least in a range $0<gk \leq n-1$ if each pixel has a third sub-pixel.

Preferably, the area of the first sub-pixel 10a is equal to or smaller than the area of the second sub-pixel 10b. If each of the plurality of pixels has three or more sub-pixels, preferably the area of the sub-pixel (the first sub-pixel in this case) to which the highest root-mean-square voltage is applied is not larger than the area of the sub-pixel (the second sub-pixel in this case) to which the lowest root-mean-square voltage is applied. Specifically, if each pixel 10 has a plurality of sub-pixels SP1, SP2, . . . , and SPn and the root-mean-square voltages applied to the liquid crystal layers are V1 (gk), V2 (gk), . . . , and Vn (gk), preferably a relationship V1 (gk)>V2 (gk)> . . . >Vn (gk) is satisfied.

Also, if the areas of the sub-pixels are SSP1, SSP2, . . . , and SSPn, preferably a relationship SSP1$\leq$SSP2$\leq$ . . . $\leq$SSPn is satisfied.

Effects of the present invention can be achieved, at least if the relationship V1 (gk)>V2 (gk)> . . . >Vn (gk) is satisfied for all grayscales except the highest and lowest grayscales (i.e., in the range $0<gk \leq n-1$). However, it is also possible to implement a configuration in which the relationship is satisfied for all the grayscales (i.e., in the range $0 \leq gk \leq n$).

In this way, if each pixel is divided into a plurality of sub-pixels and different voltages are applied to the liquid crystal layers of the sub-pixels, a mixture of different γ characteristics are observed and, thus, the viewing angle dependence of γ characteristics is reduced. Furthermore, since the difference between root-mean-square voltages are set larger at lower grayscales, the viewing angle dependence of γ characteristics is reduced greatly on the black side (at low brightness levels) in normally black mode. This is highly effective in improving display quality.

Various configurations are available to apply root-mean-square voltages to the liquid crystal layers of the sub-pixels 10a and 10b in such a way as to satisfy the above relationships.

For example, the liquid crystal display 100 can be configured as shown in FIG. 1. Specifically, whereas in the conventional liquid crystal display 100', a pixel 10 has only one pixel electrode 18 that is connected to a signal line 14 via a TFT 16, the liquid crystal display 100 has two sub-pixel electrodes 18a and 18b which are connected to different signal lines 14a and 14b via respective TFTs 16a and 16b.

Since the sub-pixels 10a and 10b compose one pixel 10, gates of the TFTs 16a and 16b are connected to a common scan line (gate busline) 12 and turned on and off by a common scan signal. Signal voltages (grayscale voltages) which satisfy the above relationship are supplied to signal lines (source busline) 14a and 14b. Preferably, the gates of the TFTs 16a and 16b are configured as a common gate.

Alternatively, in a configuration (described later) in which the first sub-pixel and second sub-pixel each comprise storage capacitor which is formed by a storage capacitor electrode connected electrically to a sub-pixel electrode, an insulating layer, and a storage capacitor counter electrode opposing the storage capacitor electrode via the insulating layer, it is preferable to provide the storage capacitor counter electrodes of the first sub-pixel and second sub-pixel being electrically independent of each other, and vary the root-mean-square voltage applied to the liquid crystal layer of the first sub-pixel and root-mean-square voltage applied to the liquid crystal layer of second sub-pixel using capacitance division by varying voltages (referred to as storage capacitor counter electrode voltages) supplied to the storage capacitor counter electrodes. By regulating the value of the storage capacitor and magnitude of the voltages supplied to the storage capacitor counter electrodes, it is possible to control the magnitudes of the root-mean-square voltages applied to the liquid crystal layers of the sub-pixels.

In this configuration, since there is no need to apply different signal voltages to sub-pixel electrodes 18a and 18b, the TFTs 16a and 16b can be connected to a common signal line and the same signal voltage can be supplied to them. Therefore, the number of signal lines is the same as in the case of the conventional liquid crystal display 100' shown in FIG. 3 and it is possible to use a signal line drive circuit with the same configuration as the conventional liquid crystal display 100'. Of course, since the TFTs 16a and 16b are connected to the same scan line, preferably they share a common gate as in the case of the above example.

Preferably, the present invention is applied to liquid crystal displays which use a vertically aligned liquid crystal layer containing nematic liquid crystal material with negative dielectric anisotropy. In particular, it is preferable that the liquid crystal layer of each sub-pixel contains four domains which are approximately 90 degrees apart in azimuth direction in which their liquid crystal molecules incline when a voltage is applied (MVA). Alternatively, the liquid crystal layer of each sub-pixel may maintain an axially symmetrical alignment at least when voltage is applied (ASM).

The embodiment of the present invention will be described in more detail below in relation to an MVA liquid crystal display 100 in which the liquid crystal layer of each sub-pixel contains four domains which are approximately 90 degrees apart in azimuth direction in which their liquid crystal molecules incline when a voltage is applied.

As shown schematically in FIG. 2A, the MVA liquid crystal display 100 comprises a liquid crystal panel 10A, phase difference compensating elements (typically, phase difference compensating plates) 20a and 20b mounted on both sides of the liquid crystal panel 10A, polarizing plates 30a and 30b which sandwich them, and a backlight 40. The transmission axes (also known as polarization axes) of the polarizing plates 30a and 30b are orthogonal to each other (crossed-Nicols arrangement) so that black is displayed when no voltage is applied to the liquid crystal layer (not shown) of the liquid crystal panel 10A (in a state of vertical alignment). The phase difference compensating elements 20a and 20b are provided to improve viewing angle characteristics of the liquid crystal display and are designed optimally using known technologies. Specifically, they have been optimized (gk=0) to minimize brightness (black level) differences between when a black screen is viewed from the front and when it is viewed obliquely from any azimuth direction. When the phase difference compensating elements 20a and 20b are optimized in this way, the present invention can produce more marked effects.

As a matter of course, the common scan line 12, signal lines 14a and 14b, and TFTs 16a and 16b (see FIG. 1) are formed on a substrate 11a to apply predetermined signal voltages to the sub-pixel electrodes 18a and 18b respectively at predetermined times. Also, to drive these components, circuits and the like are formed, as required. Besides, color filters and the like are provided on another substrate 11b, as required.

Structure of a pixel in the MVA liquid crystal display 100 will be described with reference to FIGS. 2A and 2C. Basic configuration and operation of an MVA liquid crystal display is described, for example, in Japanese Patent Laid-Open No. 11-242225.

As described with reference to FIG. 1, the pixel 10 in the MVA liquid crystal display 100 has two sub-pixels 10a and 10b, of which the sub-pixel 10a has the sub-pixel electrode 18a and the sub-pixel 10b has the sub-pixel electrode 18b. As shown schematically in FIG. 2C, the sub-pixel electrode 18a (and the sub-pixel electrode 18b (not shown)) formed on the glass substrate 11a has a slit 18s and forms a tilted electric field in conjunction with the counter electrode 17 which is placed in opposing relation to the sub-pixel electrode 18a across a liquid crystal layer 13. Also, ribs 19 protruding towards the liquid crystal layer 13 are provided on a surface of the glass substrate 11b on which the counter electrode 17 is mounted. The liquid crystal layer 13 is made of nematic liquid crystal material with negative dielectric anisotropy. When no voltage is applied, it is aligned nearly vertically by a vertical alignment film (not shown) which covers the counter electrode 17, ribs 19, and sub-pixel electrodes 18a and 18b. The liquid crystal molecules aligned vertically can be laid down safely in a predetermined direction by rib 19 surfaces (inclined faces) and the tilted electric field.

As shown in FIG. 2C, the rib 19 is inclined toward its center in such a way as to form an angle. The liquid crystal molecules are aligned nearly vertically to the inclined faces. Thus, the ribs 19 determine distribution of the tilt angle (angle formed by the substrate surface and long axis of the liquid crystal molecules) of the liquid crystal molecules. The slit 18s regularly changes the direction of the electric field applied to the liquid crystal layer. Consequently, when the electric field is applied, the liquid crystal molecules are aligned by the ribs 19 and slit 18s in four directions—upper right, upper left, lower left, and lower right—indicated by arrows in the figure, providing vertically and horizontally symmetrical, good viewing angle characteristics. A rectangular display surface of the liquid crystal panel 10A is typically oriented with its longer dimension placed horizontally and the transmission axis of the polarizing plate 30a placed parallel to the longer dimension. On the other hand, the pixel 10 is typically oriented with its longer dimension orthogonal to the longer dimension of the liquid crystal panel 10A as shown in FIG. 2B.

Preferably, as shown in FIG. 2B, the areas of the first sub-pixel 10a and second sub-pixel 10b are practically equal, each of the sub-pixels contain a first rib extending in a first direction and a second rib extending in a second direction, the first rib and the second rib in each sub-pixel are placed symmetrically with respect to a center line parallel to the scan line 12, and rib arrangement in one of the sub-pixels and rib arrangement in the other sub-pixel are symmetrical with respect to the center line orthogonal to the scan line 12. This arrangement causes the liquid crystal molecules in each sub-pixel to be aligned in four directions—upper right, upper left, lower left, and lower right—and makes the areas of the liquid crystal domains in the entire pixel including the first sub-pixel and second sub-pixel practically equal, providing vertically and horizontally symmetrical, good viewing angle characteristics. This effect is prominent when the area of the pixel is small. Furthermore, it is preferable that the center line parallel to the common scan line in each sub-pixel is placed at an interval equal to approximately one half of an array pitch of the scan line.

Next, description will be given of operation and display characteristics of the liquid crystal display 100 according to the embodiment of the present invention.

First, with reference to FIG. 4, description will be given of display characteristics of the MVA liquid crystal display which has the same electrode configuration as the conventional liquid crystal display 100' shown in FIG. 3. Incidentally, display characteristics obtained when the same root-mean-square voltage is applied to the liquid crystal layers of the sub-pixels 10a and 10b (i.e., sub-pixel electrodes 18a and 18b) in the liquid crystal display 100 according to the embodiment of the present invention are approximately equal to those of the conventional liquid crystal display.

Figure 4C:
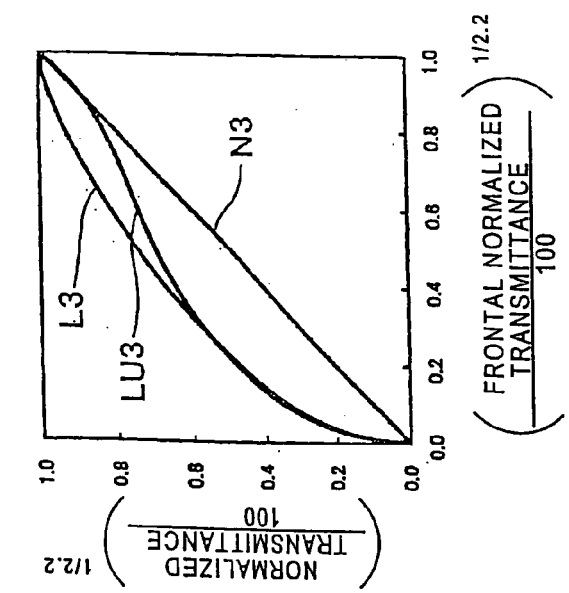
FIGS. 4A to 4C are diagrams illustrating display characteristics of an MVA liquid crystal display, where
Figure 4B:
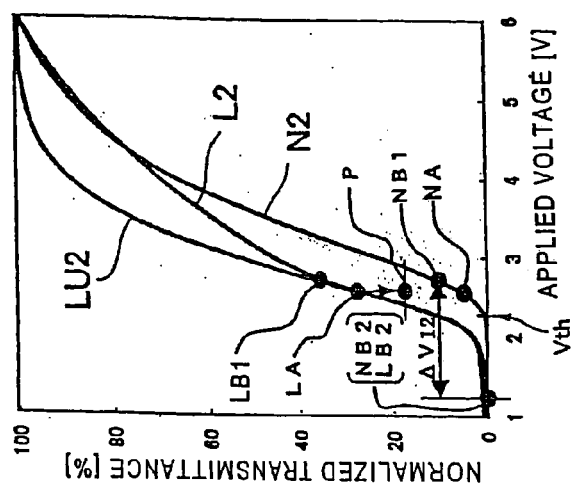
Figure 4A:
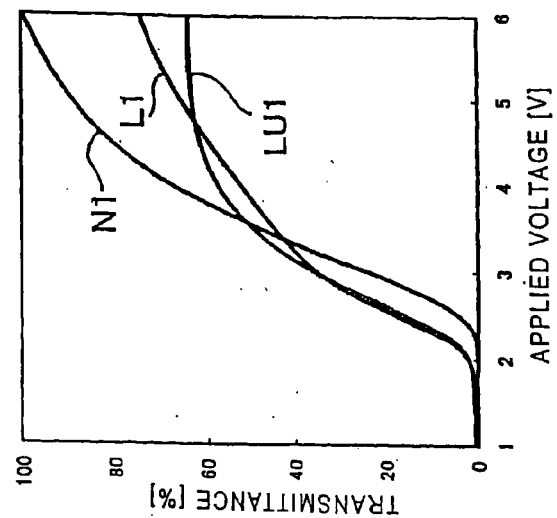

FIG. 4A shows dependence of transmittance on applied voltage when the display is viewed straightly from the front (N1), from the right at an angle of 60 degrees (L1), and from the upper right at an angle of 60 degrees (LU1). FIG. 4B is a diagram showing the three transmittances in FIG. 4A after being normalized by taking the transmittance obtained by the application of the highest grayscale voltage (voltage required to display white) as 100%. It shows dependence of normalized transmittance on applied voltage under the three conditions: a frontal viewing condition (N2), right side 60-degree viewing condition (L2), and upper-right side 60-degree viewing condition (LU2). Incidentally, the phase "60 degrees" here means an angle of 60 degrees from the normal to the display surface.

As can be seen from FIG. 4B, frontal viewing display characteristics differ from right side 60-degree viewing and upper-right side 60-degree viewing display characteristics. This indicates that the γ characteristics depend on the viewing direction.

FIG. 4C shows differences in the γ characteristics more lucidly. To illustrate the differences in the γ characteristics clearly, the horizontal axis represents (frontal normalized transmittance÷100)^ (1/2.2) while the vertical axis represents grayscale characteristics under the N3, L3, and LU3 conditions as follows: frontal viewing grayscale characteristics=(frontal normalized transmittance÷100)^ (1/2.2), right side 60-degree viewing grayscale characteristics=(right side 60-degree normalized transmittance÷100)^ (1/2.2), and upper-right side 60-degree viewing grayscale characteristics=(normalized upper-right side 60-degree viewing transmittance÷100)^ (1/2.2), where "^" indicates power and the reciprocal of the power exponent corresponds to a γ value. In a typical liquid crystal display, the γ value for the frontal viewing grayscale characteristics is set at 2.2.

Referring to FIG. 4C, ordinate values coincide with abscissa values under the frontal viewing condition (N3), and thus the grayscale characteristics under this condition (N3) are linear. On the other hand, the right side 60-degree viewing grayscale characteristics (L3) and upper-right side 60-degree viewing grayscale characteristics (LU3) are curvilinear. Deviations of the curves (L3 and LU3) from the straight line under the frontal viewing condition (N3) quantitatively represent respective deviations in the γ characteristics, i.e., deviations (differences) in grayscale display.

The present invention aims at reducing such deviations in normally black liquid crystal display. Ideally, the curves (L3 and LU3) which represent the right side 60-degree viewing grayscale characteristics (L3) and upper-right side 60-degree viewing grayscale characteristics (LU3) coincide with the straight line which represent the frontal viewing grayscale characteristics (N3). Effects on improving the γ characteristics will be evaluated below with reference to a drawing which shows deviations in the γ characteristics as is the case with FIG. 4C.

With reference FIG. 4B, description will be given of a principle of how the present invention can reduce the deviations in the γ characteristics by providing a first sub-pixel and second sub-pixel in each pixel and applying different root-mean-square voltages to the liquid crystal layers of the sub-pixels. It is assumed here that the first sub-pixel and second sub-pixel have the same area.

With the conventional liquid crystal display 100', at a voltage at which the frontal viewing transmittance is represented by point NA, the right side 60-degree viewing transmittance is represented by point LA representing the right side 60-degree viewing transmittance at the same voltage as the NA. With the present invention, to obtain the same frontal viewing transmittance as at point NA, frontal viewing transmittances of the first sub-pixel and second sub-pixel can be set at points NB1 and NB2, respectively. Since the frontal viewing transmittance at point NB2 is approximately zero and the first sub-pixel and second sub-pixel have the same area, the frontal viewing transmittance at point NB1 is twice the frontal viewing transmittance at point NA. The difference in root-mean-square voltage between points NB1 and NB2 is ΔV12. Also, with the present invention, the right side 60-degree viewing transmittance is represented by point P, which is given as the average of the right side 60-degree viewing transmittances LB1 and LB2 at the same voltages as at points NB1 and NB2, respectively.

With the liquid crystal display according to the present invention, point P which represents the right side 60-degree viewing transmittance is closer to point NA which represents the corresponding frontal viewing transmittance than is point LA which represents the right side 60-degree viewing transmittance of the conventional liquid crystal display 100'. This means reduced deviations in the γ characteristics.

From the above description, it can be seen that the fact that the right side 60-degree viewing transmittance (see point LB2) of the second sub-pixel is approximately zero enhances the effect of the present invention. Thus, to enhance the effect of the present invention, it is preferable to curb increases in transmittance when a black screen is viewed obliquely. From this stand point, it is preferable to install the phase difference compensating elements 20a and 20b shown in FIG. 2A, as required, so as to curb increases in transmittance when a black screen is viewed obliquely.

The liquid crystal display 100 according to the present invention improves the γ characteristics by applying different root-mean-square voltages to the two liquid crystal layers of the respective sub-pixels 10a and 10b in each pixel 10. In so doing, the difference ΔV12 (gk)=V1 (gk)–V2 (gk) between the root-mean-square voltages applied to the respective liquid crystal layers of the sub-pixel 10a and sub-pixel 10b is set in such a way as to satisfy the relationships ΔV12 (gk)>0 volts and ΔV12 (gk)≧ΔV12 (gk+1). A case in which the above relationships are satisfied in the entire range of 0<gk≦n will be described below (FIGS. 5B and 5C).

FIGS. 5A, 5B, 5C, and 5D show various relationships between the root-mean-square voltage V1 (gk) applied to the liquid crystal layer of the first sub-pixel 10a and root-mean-square voltage V2 (gk) applied to the liquid crystal layer of the second sub-pixel 10b in the pixel 10 shown in FIG. 1.

Figure 5A:
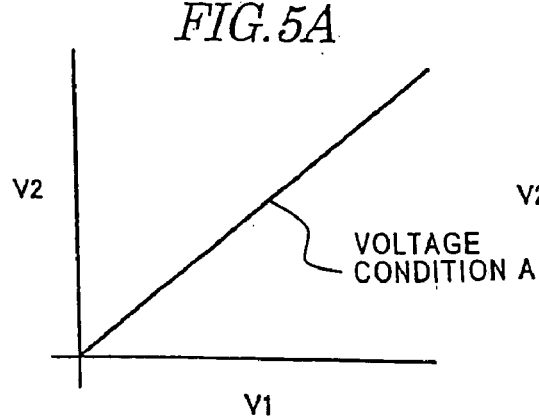
FIGS. 5A to 5D are diagrams showing conditions A to D, respectively, of voltages to be applied to liquid crystal layers of sub-pixels obtained by dividing pixels.

Under voltage application condition A shown in FIG. 5A, the same voltage (V1=V2) is applied to the liquid crystal layers of the two sub-pixels 10a and 10b. Thus, ΔV12 (gk)=0 volts.

Figure 5B:
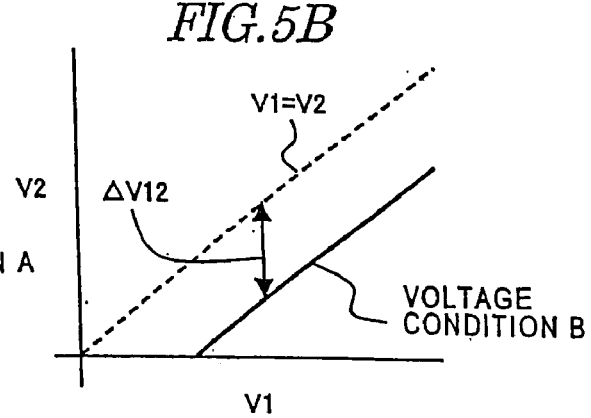
Figure 5C:
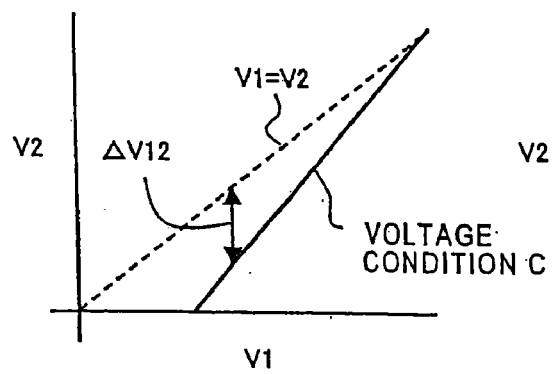

Under voltage condition B shown in FIG. 5B, the relationship V1>V2 holds and ΔV12 is constant regardless of the value of V1. Thus, under voltage condition B, the relationship ΔV12 (gk)=ΔV12 (gk+1) is satisfied for any grayscale gk. This embodiment uses ΔV12 (gk)=1.5 volts as a typical value, but, of course, another value may be used. A large value of ΔV12 (gk) enhances the effect of the present invention, but poses a problem of lowered brightness (transmittance) in white mode. Furthermore, there is the problem that when the value of ΔV12 (gk) exceeds a threshold voltage (i.e., Vth shown in FIG. 4B) for the transmittance of the liquid crystal display, the brightness (transmittance) in black mode increases, lowering display contrast. Thus, it is preferable that ΔV12 (gk)≦Vth.

Under voltage condition C shown in FIG. 5C, the relationship V1>V2 holds and ΔV12 decreases with increases in V1. Thus, under voltage condition C, the relationship ΔV12 (gk)>ΔV12 (gk+1) is satisfied for any grayscale gk. This embodiment uses ΔV12 (0)=1.5 volts and ΔV12 (n)=0 volts as typical values, but, of course, other values may be used. However, as described above, it is preferable that ΔV12 (gk)≦Vth from the standpoint of display contrast during oblique viewing while it is preferable that $\Delta V12$ (n)=0 volts from the standpoint of brightness in white mode.

Figure 5D:
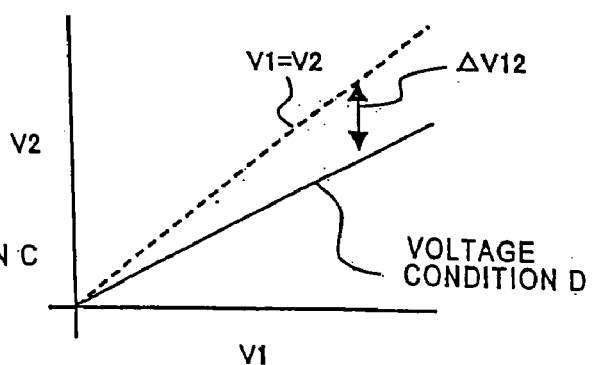

Under voltage condition D shown in FIG. 5D, the relationship V1>V2 holds and $\Delta V12$ increases with increases in V1. Thus, under voltage condition D, the relationship $\Delta V12$ (gk)<$\Delta V12$ (gk+1) holds for any grayscale gk.

This embodiment uses $\Delta V12$ (0)=0 volts and $\Delta V12$ (n)=1.5 volts as typical values.

In the liquid crystal display 100 according to the embodiment of the present invention, voltage is applied to the liquid crystal layers of the sub-pixels 10a and 10b such that voltage condition B or voltage condition C will be satisfied. Incidentally, although the condition $\Delta V12>0$ is satisfied for all grayscales in FIGS. 5B and 5C, $\Delta V12=0$ is all right in the case of an optimum grayscale or the highest grayscale.

Grayscale characteristics of the MVA liquid crystal display under voltage conditions A to D will be described with reference to FIG. 6. The horizontal axis in FIGS. 6A and 6B represents (frontal normalized transmittance÷100)^(1/2.2), the vertical axis in FIG. 6A represents (right side 60-degree normalized transmittance÷100)^(1/2.2), and the vertical axis in FIG. 6B represents (normalized upper-right side 60-degree viewing transmittance÷100)^(1/2.2). A straight line which represents frontal viewing grayscale characteristics is shown together for the purpose of reference.

Under voltage condition A, the same voltage ($\Delta V12$ (gk)=0) is applied to the liquid crystal layers of the sub-pixels 10a and 10b. As shown in FIGS. 6A and 6B, the $\gamma$ characteristics deviate greatly, as with the conventional liquid crystal display shown in FIG. 4.

Voltage condition D has less effect on reducing the viewing angle dependence of $\gamma$ characteristics than do voltage conditions B and C. Voltage condition D corresponds, for example, to voltage conditions for pixel division using conventional capacitance division described in Japanese Patent Laid-Open No. 6-332009. Although it has the effect of improving viewing angle characteristics in normally white mode, it does not have much effect on reducing the viewing angle dependence of $\gamma$ characteristics in normally black mode.

As described above, preferably voltage condition B or C is used to reduce viewing angle dependence of $\gamma$ characteristics in normally black mode.

Figure 7:
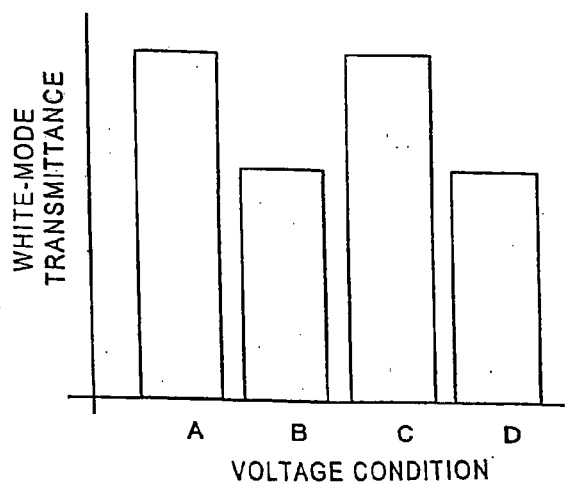
FIG. 7 is a graph showing white-mode transmittance (frontal viewing) obtained under voltage conditions A to D.

Next, with reference to FIG. 7, description will be given of variations in white-mode transmittance among voltage conditions, i.e., when the highest grayscale voltage is applied.

The transmittance in white mode is naturally lower under voltage conditions B and D than under voltage condition A. The transmittance in white mode under voltage condition C is equivalent to transmittance under voltage condition A. In this respect, voltage condition C is preferable to voltage conditions B and D. Thus, taking into consideration the viewing angle dependence of $\gamma$ characteristics as well as transmittance in white mode, it can be said that voltage condition C is superior.

Next, preferable area ratios between sub-pixels will be described.

According to the present invention, if the root-mean-square voltages applied to the liquid crystal layers of the sub-pixels SP1, SP2, . . . , and SPn are V1, V2, . . . , Vn, if the areas of the sub-pixels are SSP1, SSP2, . . . , and SSPn, and if a relationship V1>V2> . . . >Vn holds, preferably, a relationship SSP1≦SSPn is satisfied. This will be described below.

Figure 9:
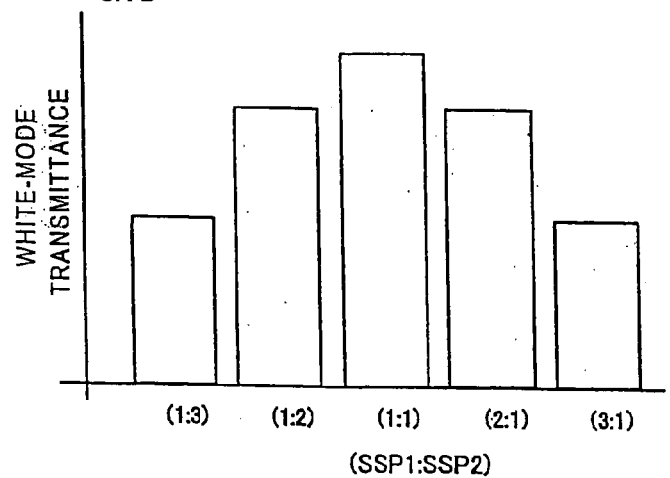
FIG. 9 is a diagram showing relationship between white-mode transmittance (frontal viewing) and sub-pixel area ratios under voltage condition C according to the embodiment of the present invention.

Assuming that SSP1 and SSP2 are the area of the sub-pixels 10a and 10b in the pixel 10 shown in FIG. 1, FIG. 8 compares $\gamma$ characteristics among their area ratios (SSP1: SSP2)=(1:3), (1:2), (1:1), (2:1), (3:1) under voltage condition C. FIG. 8A shows right viewing $\gamma$ characteristics while FIG. 8B shows upper-right viewing $\gamma$ characteristics. FIG. 9 shows frontal viewing transmittance for different split ratios.

As can be seen from FIG. 8, decreasing the area ratio of the sub-pixel (10a) to which the higher voltage is applied is more effective in reducing the viewing angle dependence of $\gamma$ characteristics.

The transmittance in white mode takes the maximum value when the area ratio is (SSP1:SSP2)=(1:1) and lowers as the area ratio becomes uneven. This is because a good multi-domain vertical alignment is no longer available if the area ratio becomes uneven, reducing the area of the first sub-pixel or second sub-pixel. This tendency is pronounced in high-resolution liquid crystal displays, which has small pixel areas. Thus, although it is preferable that the area ratio is 1:1, it can be adjusted, as required, taking into consideration its effect on reducing the viewing angle dependence of $\gamma$ characteristics, the transmittance in white mode, the uses of the liquid crystal display, etc.

Next, the number of pixel divisions will be described.

Although with the liquid crystal display 100 shown in FIG. 1, a pixel 10 is composed of two sub-pixels (10a and 10b), the present invention is not limited to this and the number of sub-pixels may be three or more.

Figure 11:
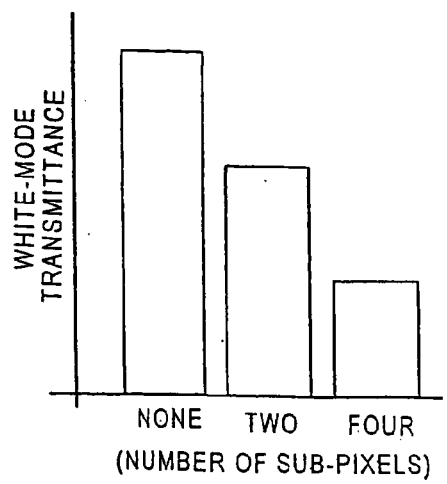
FIG. 11 is a diagram showing relationship between white-mode transmittance (frontal viewing) and sub-pixel counts under voltage condition B according to the embodiment of the present invention.

FIG. 10 compares the $\gamma$ characteristics obtained under three conditions: when a pixel is divided into two sub-pixels, when a pixel is divided into four sub-pixels, and when a pixel is not divided. FIG. 10A shows right viewing $\gamma$ characteristics while FIG. 10B shows upper-right viewing $\gamma$ characteristics. FIG. 11 shows corresponding transmittances of the liquid crystal display in white mode. The area of a pixel was constant and voltage condition B was used.

It can be seen from FIG. 10, increases in the number of sub-pixels increase the effect of correcting the deviations in $\gamma$ characteristics. Compared to when pixels are not divided, the effect is especially pronounced when a pixel is divided into two sub-pixels. When the number of divisions is increased from two to four, although there is not much difference in deviations in $\gamma$ characteristics, characteristics are improved in terms of smooth changes in deviations in relation to grayscale changes. However, as can be seen from FIG. 11, the transmittance (frontal viewing) in white mode falls as the number of divisions increases. It falls greatly, especially when the number of divisions is increased from two to four. The main reason for this great fall is that the area of each sub-pixel is reduced greatly as described above. The main reason for reduction in transmittance when no-division and two-division conditions are compared is the use of voltage condition B. Thus, it is advisable to adjust the number of divisions, as required, taking into consideration its effect on reducing the viewing angle dependence of $\gamma$ characteristics, the transmittance in white mode, the uses of the liquid crystal display, etc.

From the above, it can be seen that deviations in $\gamma$ characteristics, shape distortion of the deviations, and the viewing angle dependence of $\gamma$ characteristics are reduced with increases in the number of pixel divisions. These effects are most pronounced when no-division and two-division (two sub-pixels) conditions are compared. Thus, it is preferable to divides a pixel into two sub-pixels, considering also the falls in white-mode transmittance resulting from increases in the number of sub-pixels as well as falls in manufacturability.

In the liquid crystal display 100 shown in FIG. 1, the sub-pixels 10a and 10b are connected independently of each other to the TFT 16a and TFT 16b, respectively. The source electrodes of the TFTs 16a and 16b are connected to the signal lines 14a and 14b, respectively. Thus, the liquid crystal display 100 allows any root-mean-square voltage to be applied to each of the liquid crystal layers of sub-pixels, but requires twice as many signal lines (14a and 14b) as the signal lines 14 of the conventional liquid crystal display 100' shown in FIG. 3, also requiring twice as many signal line drive circuits.

In contrast, a liquid crystal display 200 according to another preferred embodiment of the present invention has the same number of signal lines as does the conventional liquid crystal display 100', but can apply mutually different root-mean-square voltages to the liquid crystal layers of the sub-pixels 10a and 10b under a voltage condition similar to the voltage condition C described above.

Figure 12:
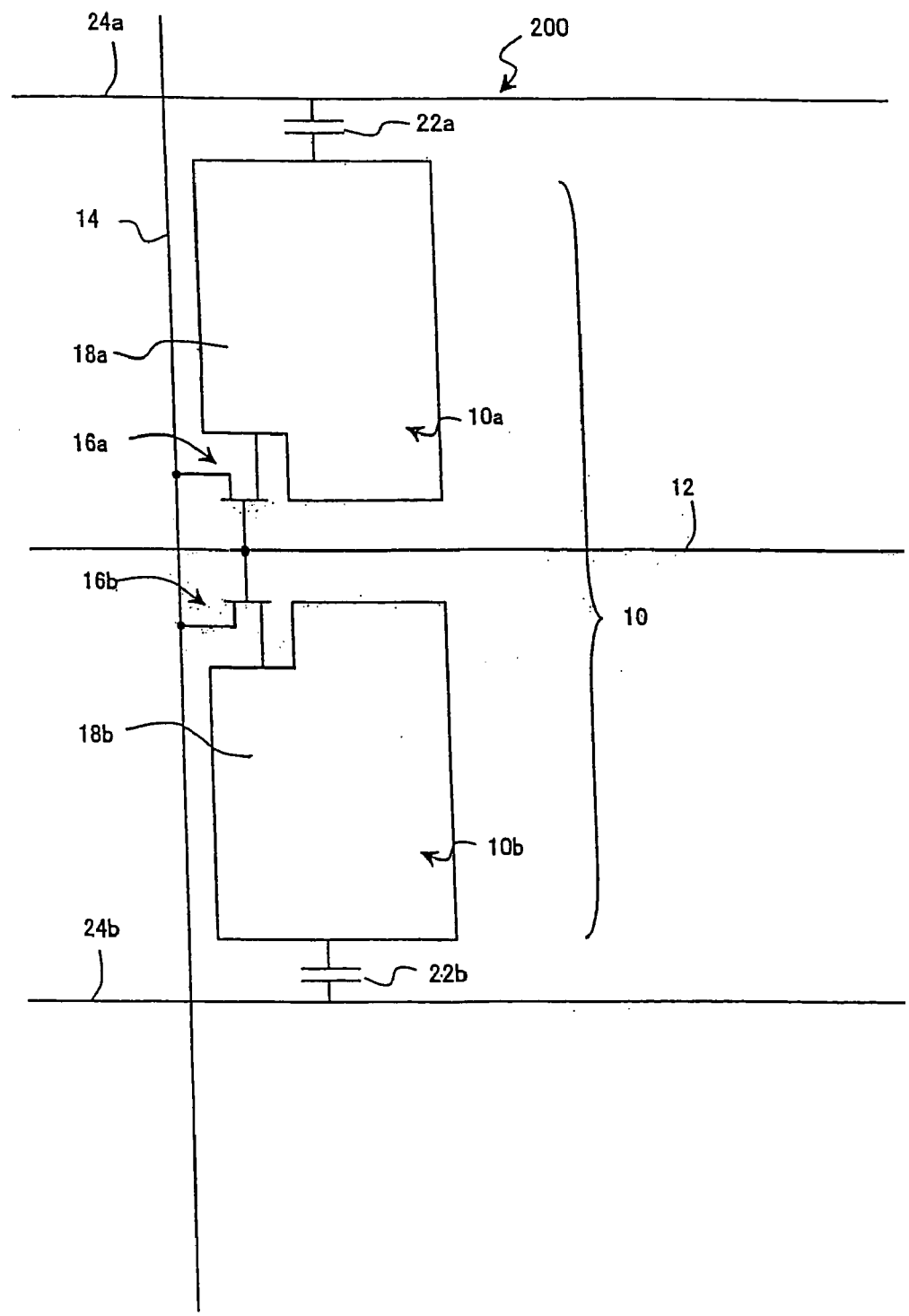
FIG. 12 is a schematic diagram showing a pixel structure of a liquid crystal display 200 according to another embodiment of the present invention.

FIG. 12 schematically shows an electrical configuration of the liquid crystal display 200 according to the other embodiment of the present invention. Components which have practically the same functions as those of the liquid crystal display 100 shown in FIG. 1 are denoted by the same reference numerals as the corresponding components and description thereof will be omitted.

A pixel 10 is divided into sub-pixels 10a and 10b, which are connected with TFT 16a and TFT 16b and storage capacitors (CS) 22a and 22b, respectively. The TFT 16a and TFT 16b have their gate electrodes connected to a scan line 12, and their source electrodes to the a common (the same) signal line 14. The storage capacitors 22a and 22b are connected to storage capacitor lines (CS bus line) 24a and 24b, respectively. The storage capacitors 22a and 22b are formed, respectively, by storage capacitor electrodes electrically connected with sub-pixel electrodes 18a and 18b, storage capacitor counter electrodes electrically connected with the storage capacitor lines 24a and 24b, and insulating layers (not shown) formed between them. The storage capacitor counter electrodes of the storage capacitors 22a and 22b are independent of each other and are supplied with mutually different storage capacitor counter voltages from the storage capacitor lines 24a and 24b.

Next, with reference to drawings, description will be given of a principle of how the liquid crystal display 200 can apply different root-mean-square voltages to the liquid crystal layers of the sub-pixels 10a and 10b.

Figure 13:
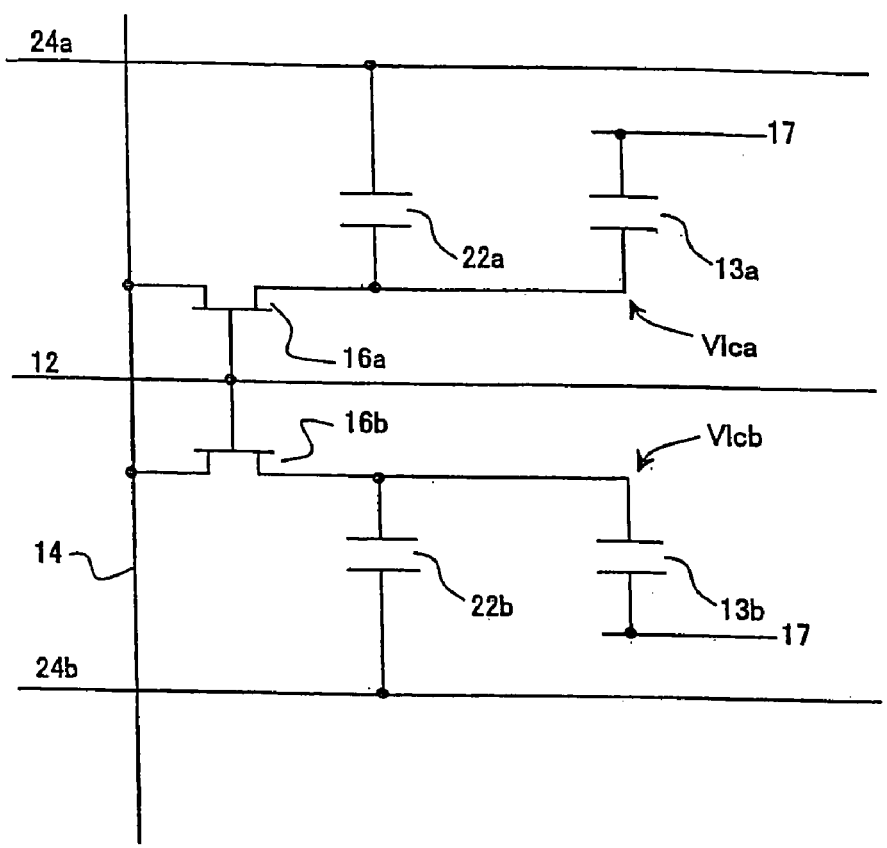
FIG. 13 is a diagram showing an equivalent circuit for a pixel of the liquid crystal display 200.

FIG. 13 shows an equivalent circuit for one pixel of the liquid crystal display 200. In the electric equivalent circuit, the liquid crystal layers of the sub-pixels 10a and 10b are denoted by 13a and 13b. Liquid crystal capacitors formed by the sub-pixel electrodes 18a and 18b, liquid crystal layers 13a and 13b, and counter electrode 17 (common to the sub-pixels 10a and 10b) are denoted by Clca and Clcb.

It is assumed that the liquid crystal capacitors Clca and Clcb have the same capacitance value CLC (V). The value of CLC (V) depends on the root-mean-square voltages applied to the liquid crystal layers of the sub-pixels 10a and 10b. The storage capacitors 22a and 22b connected to liquid crystal capacitors of the sub-pixels 10a and 10b independently of each other are represented by Ccsa and Ccsb and it is assumed that their capacitance value is CCS.

Both liquid crystal capacitor Clca of the sub-pixel 10a and storage capacitor Ccsa have one of their electrodes connected to the drain electrode of the TFT 16a provided to drive the sub-pixel 10a. The other electrode of the liquid crystal capacitor Clca is connected to the counter electrode while the other electrode of the storage capacitor Ccsa is connected to the storage capacitor line 24a. Both liquid crystal capacitor Clcb of the sub-pixel 10b and storage capacitor Ccsb have one of their electrodes connected to the drain electrode of the TFT 16b provided to drive the sub-pixel 10b. The other electrode of the liquid crystal capacitor Clcb is connected to the counter electrode while the other electrode of the storage capacitor Ccsb is connected to the storage capacitor line 24b. The gate electrodes of the TFT 16a and TFT 16b are connected to the scan line 12 and their source electrodes are connected to the signal line 14.

Figure 14:
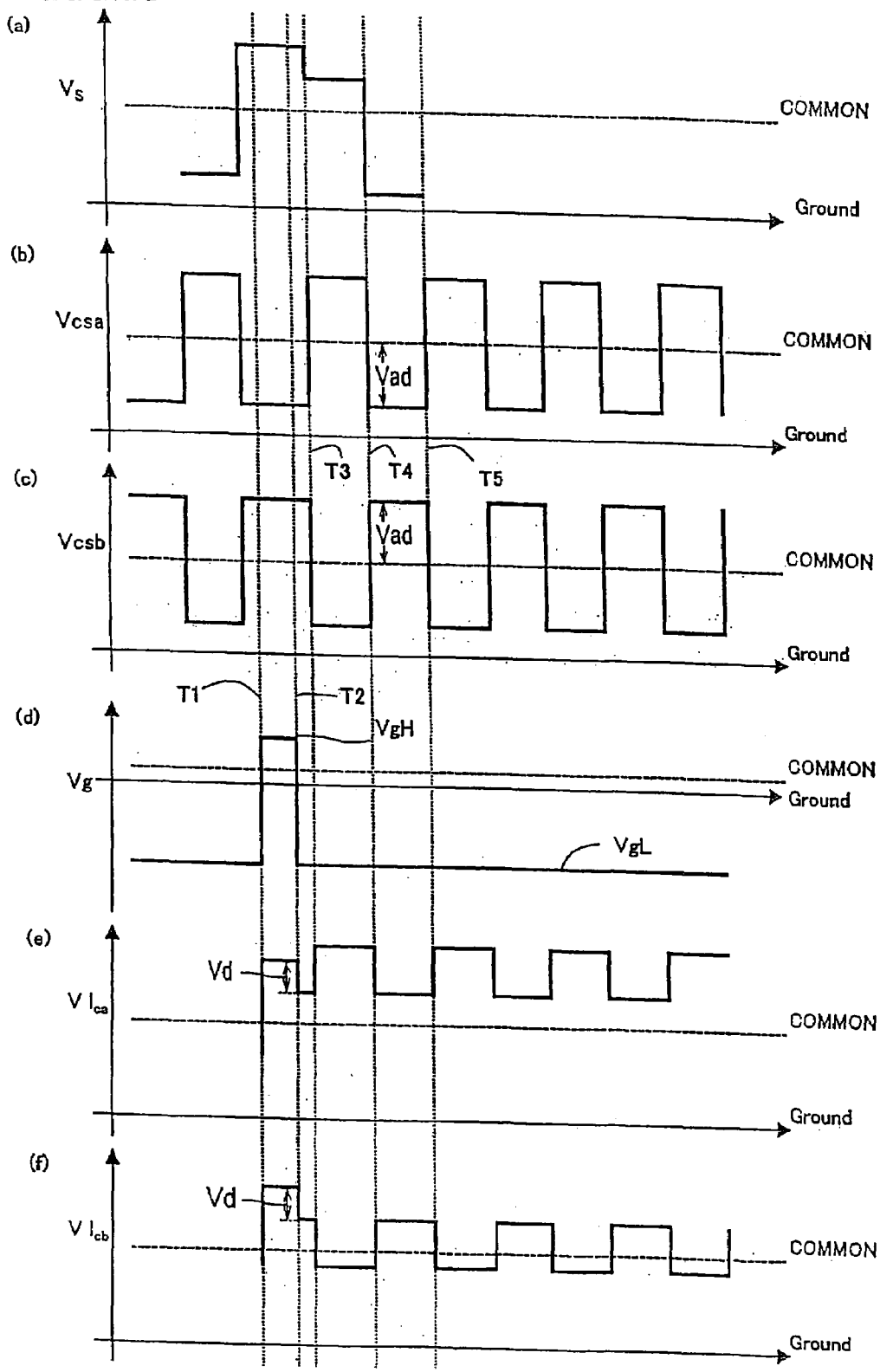
FIG. 14 is a diagram showing various voltage waveforms (a)–(f) for driving the liquid crystal display 200.

FIG. 14 schematically shows voltage application timings for driving the liquid crystal display 200.

In FIG. 14, the waveform (a) is a voltage waveform Vs of the signal line 14, the waveform (b) is a voltage waveform Vcsa of the storage capacitor line 24a, the waveform (c) is a voltage waveform Vcsb of the storage capacitor line 24b, the waveform (d) a voltage waveform Vg of the scan line 12, the waveform (e) is a voltage waveform Vlca of the sub-pixel electrode 18a of the sub-pixel 10a, and the waveform (f) is a voltage waveform Vlcb of the sub-pixel electrode 18b of the sub-pixel 10b. The broken lines in the figures indicate a voltage waveform COMMON (Vcom) of the counter electrode 17.

Operation of the equivalent circuit in FIG. 13 will be described with reference to FIG. 14.

At time T1, when the voltage Vg changes from VgL to VgH, the TFT 16a and TFT 16b are turned on simultaneously and the voltage Vs is transmitted from the signal line 14 to the sub-pixel electrodes 18a and 18b of the sub-pixels 10a and 10b, causing the sub-pixels 10a and 10b to be charged. Similarly, the storage capacitors Csa and Csb of the respective sub-pixels are charged from the signal line.

At time T2, when the voltage Vg of the scan line 12 changes from VgH to VgL, the TFT 16a and TFT 16b are turned off simultaneously. Consequently, the sub-pixels 10a and 10b and storage capacitors Csa and Csb are all cut off from the signal line 14. Immediately afterwards, due to drawing effect caused by parasitic capacitance of the TFT 16a and TFT 16b and the like, voltages Vlca and Vlcb of the respective sub-pixels fall by approximately the same voltage Vd to:

$$Vlca=Vs-Vd$$

$$Vlcb=Vs-Vd$$

At this time, the voltages Vcsa and Vcsb of the respective storage capacitor lines are:

$$Vcsa=Vcom-Vad$$

$$Vcsb=Vcom+Vad$$

At time T3, the voltage Vcsa of the storage capacitor line 24a connected to the storage capacitor Csa changes from "Vcom−Vad" to "Vcom+Vad" and the voltage Vcsb of the storage capacitor line 24b connected to the storage capacitor Csb changes by twice Vad from "Vcom+Vad" to "Vcom−Vad." As a result of the voltage changes of the storage capacitor lines 24a and 24b, voltages Vlca and Vlcb of the respective sub-pixels change to:

$$Vlca=Vs-Vd+2\times K\times Vad$$

$$Vlcb=Vs-Vd-2\times K\times Vad$$

where, K=CCS/(CLC (V)+CCS)

At time T4, Vcsa changes from "Vcom+Vad" to "Vcom−Vad" and Vcsb changes from "Vcom−Vad" to "Vcom+Vad," by twice Vad. Consequently, Vlca and Vlcb change from:

$$Vlca=Vs-Vd+2\times K\times Vad$$

$$Vlcb=Vs-Vd-2\times K\times Vad$$

To:

$$Vlca = Vs - Vd$$

$$Vlcb = Vs - Vd$$

At time T5, Vcsa changes from "Vcom−Vad" to "Vcom+Vad," by twice Vad and Vcsb changes from "Vcom+Vad" to "Vcom−Vad," by twice Vad. Consequently, Vlca and Vlcb change from:

$$Vlca = Vs - Vd$$

$$Vlcb = Vs - Vd$$

To:

$$Vlca = Vs - Vd + 2 \times K \times Vad$$

$$Vlcb = Vs - Vd - 2 \times K \times Vad$$

Vcsa, Vcsb, Vlca, and Vlcb alternate the above changes at T4 and T5 at intervals of an integral multiple of horizontal write time 1H. The multiple—1, 2, or 3—used for the alternating intervals can be set, as required, by taking into consideration a drive method (method of polarity inversion, etc.) and display conditions (flickering, graininess, etc.) of the liquid crystal display. These alternating cycles are repeated until the pixel 10 is rewritten the next time, i.e., until a time equivalent to T1. Thus, effective values of the voltages Vlca and Vlcb of the sub-pixels are:

$$Vlca = Vs - Vd + K \times Vad$$

$$Vlcb = Vs - Vd - K \times Vad$$

Thus, the root-mean-square voltages V1 and V2 applied to the liquid crystal layers 13a and 13b of the sub-pixels 10a and 10b are:

$$V1 = Vlca - Vcom$$

$$V2 = Vlcb - Vcom$$

Hence, $$V1 = Vs - Vd + K \times Vad - Vcom$$

$$V2 = Vs - Vd - K \times Vad - Vcom$$

Therefore, difference $\Delta V12$ (=V1−V2) between the root-mean-square voltages applied to the liquid crystal layers 13a and 13b of the sub-pixels 10a and 10b is given as $\Delta V12 = 2 \times K \times Vad$ (where, K=CCS/(CLC (V)+CCS)). This means that mutually different voltages can be applied.

Figure 15:
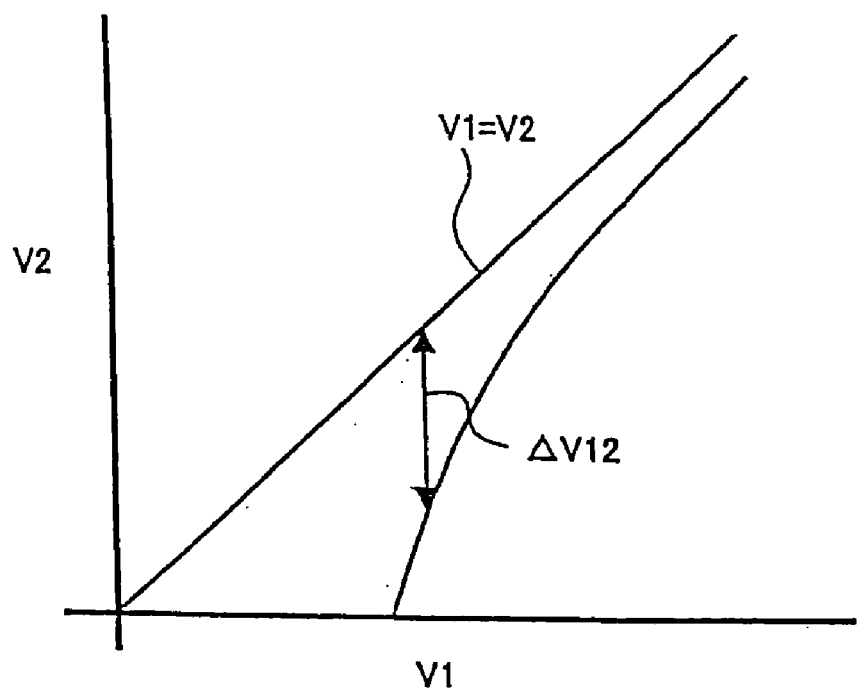
FIG. 15 is a diagram showing relationship between voltages applied to liquid crystal layers of sub-pixels in the liquid crystal display 200.

The relationship between V1 and V2 according to this embodiment shown in FIGS. 12 to 14 is shown schematically in FIG. 15.

As can be seen from FIG. 15, in the liquid crystal display 200 according to this embodiment, the smaller the value of V1, the larger the value of $\Delta V12$. This is similar to the results obtained under the voltage condition C described above. The fact that the value of $\Delta V12$ changes depending on V1 or V2 is attributable to voltage dependence of the capacitance value CLC (V) of the liquid crystal capacitor.

The γ characteristics of the liquid crystal display 200 according to this embodiment is shown in FIG. 16. The γ characteristics obtained when the same voltage is applied to the sub-pixels 10a and 10b are also shown in FIG. 16 for comparison. It can be seen from the figure that γ characteristics are improved also in the liquid crystal display according to this embodiment.

As described above, embodiments of the present invention can improve the γ characteristics of normally black liquid crystal displays, especially MVA liquid crystal displays. However, the present invention is not limited to this and can be applied to IPS liquid crystal displays as well.

Next, description will be given of liquid crystal displays according to embodiments in a second aspect of the present invention.

Description will be given of a preferred form of a pixel arrangement (array of sub-pixels) or drive method which can reduce "flickering" on a liquid crystal display where each pixel has at least two sub-pixels differing from each other in brightness when displaying an intermediate grayscale. Although configuration and operation of the liquid crystal display according to this embodiment will be described here taking as an example the liquid crystal display with the divided pixel structure according to the embodiment in the first aspect of the present invention, the effect produced by a pixel arrangement is not restricted by a method of pixel division, and a liquid crystal display with another divided-pixel structure may be used as well.

A problem of "flickering" on a liquid crystal display will be described first.

Typical liquid crystal displays are designed to use alternating voltage as the voltage applied to liquid crystal layers of pixels (sometimes referred to as an "ac driving method") from a reliability point of view. Magnitude relationship in potential between pixel electrode and counter electrode is reversed at certain time intervals, and consequently, direction of the electric field (electric lines of force) applied to each liquid crystal layer is reversed at the time intervals. With typical liquid crystal displays in which the counter electrode and pixel electrode are mounted on different substrates, the direction of the electric field applied to each liquid crystal layer is reversed from the light source-to-viewer direction to the viewer-to-light source direction.

Typically, the direction reversal cycle of the electric field applied to each liquid crystal layer is twice (e.g., 33.333 ms) the frame period (e.g., 16.667 ms). In other words, in a liquid crystal display, the direction of the electric field applied to each liquid crystal layer is reversed each time a displayed image (frame image) changes. Thus, when displaying a still image, if electric field strengths (applied voltages) in alternate directions do not match exactly, i.e., if the electric field strength changes each time the direction of the electric field changes, the brightness of pixels changes with changes in the electric field strength, resulting in flickering of the display.

To prevent flickering, it is necessary to equate the electric field strengths (applied voltages) in alternate directions exactly. However, with liquid crystal displays produced industrially, it is difficult to exactly equate the electric field strengths in alternate directions. Therefore, to reduce flickering, pixels with electric fields opposite in direction are placed next to each other, thereby averaging brightness of pixels spatially. Generally, this method is referred to as "dot inversion" or "line inversion." Various "inversion driving" methods are available, including inversion of a checkered pattern on a pixel by pixel basis (row-by-row, column-by-column polarity inversion: 1-dot inversion), line-by-line inversion (row-by-row inversion: 1-line inversion), and polarity inversion every two rows and every column. One of them is selected as required.

As described above, to implement high quality display, preferably the following three conditions are satisfied: (1) use ac driving so that the direction of the electric field applied to each liquid crystal layer is reversed at certain time intervals, for example, every frame period, (2) equate the voltages applied to each liquid crystal layer (or quantities of electric charge stored in the liquid crystal capacitor) in alternate field directions as well as quantities of electric charge stored in the storage capacitor, and (3) place pixels opposite in the direction of the electric field (sometimes referred to as "voltage polarity") applied to the liquid crystal layer, next to each other in each vertical scanning period (e.g., frame period). Incidentally, the term "vertical scanning period" can be defined as the period after a scan line is selected until the scan line is selected again. One scanning period is equivalent to one frame period in the case of non-interlaced driving and corresponds to one field period in the case of interlaced driving. Also, in each vertical scanning period, the difference (period) between the time when a scan line is selected and the time when the scan line is selected again is referred to as one horizontal scanning period (1 H).

The above-described embodiment of the present invention implements display with excellent viewing angle characteristics by dividing each pixel into at least two sub-pixels and making their brightness (transmittance) different from each other. The inventor found that when each pixel is divided into a plurality of sub-pixels which are intentionally made to vary in brightness, it is preferable that a fourth condition concerning sub-pixel arrangement is satisfied in addition to the three conditions described above. Specifically, it is preferable that the sub-pixels which are intentionally made to vary in brightness are placed in random order of brightness whenever possible. It is most preferable in terms of display quality not to place sub-pixels equal in brightness next to each other in the column or row direction. In other word, most preferably sub-pixels equal in brightness are arranged in a checkered pattern.

A drive method, pixel arrangement, and sub-pixel arrangement suitable for the above-described embodiment of the present invention will be described below.

An example of a drive method for the liquid crystal display according to the embodiment of the present invention will be described with reference to FIGS. 17 and 18.

Figure 17:
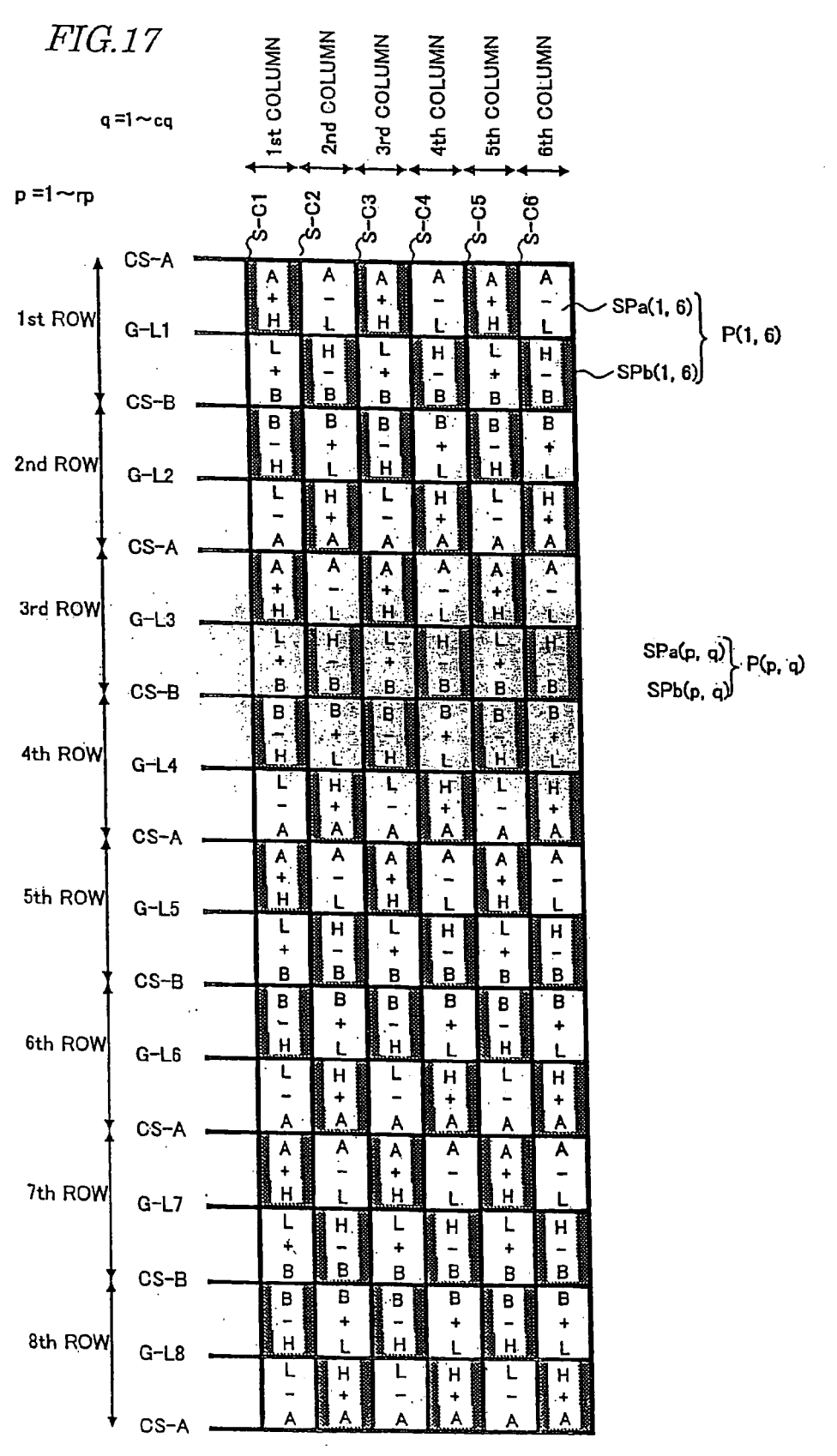

Description will be given below, citing an example in which pixels are arranged in a matrix (rp, cq) with a plurality of rows (1 to rp) and plurality of columns (1 to cq), where each pixel is expressed as P (p, q) (where $1 \leq p \leq rp$ and $1 \leq q \leq cq$) and has at least two sub-pixels SPa (p, q) and SPb (p, q), as shown in FIG. 17. FIG. 17 is a schematic diagram partially showing a relative arrangement (8 rows×6 columns) of: signal lines S-C1, S-C2, S-C3, S-C4, . . . , S-Ccq; scan lines G-L1, G-L2, G-L3, . . . , G-Lrp; storage capacitor lines CS-A and CS-B; pixels P (p, q); and sub-pixels SPa (p, q) and SPb (p, q) which compose the pixels, in the liquid crystal display according to this embodiment.

As shown in FIG. 17, one pixel P (p, q) has sub-pixels SPa (p, q) and SPb (p, q) on either side of the scan line G-Lp which runs through the pixel horizontally at approximately the center. The sub-pixels SPa (p, q) and SPb (p, q) are arranged in the column direction in each pixel. The storage capacitor electrodes (not shown) of the sub-pixels SPa (p, q) and SPb (p, q) are connected to adjacent storage capacitor lines CS-A and CS-B, respectively. The signal lines S-Ccq which supply signal voltages to the pixels P (p, q) according to the image displayed run vertically (in the column direction) between pixels to supply the signal voltages to TFT elements (not shown) of the sub-pixels on the right of the signal lines. According to the configuration shown in FIG. 17, one storage capacitor line or one scan line is shared by two sub-pixels. This has the advantage of increasing the opening rate of pixels.

Figure 18:
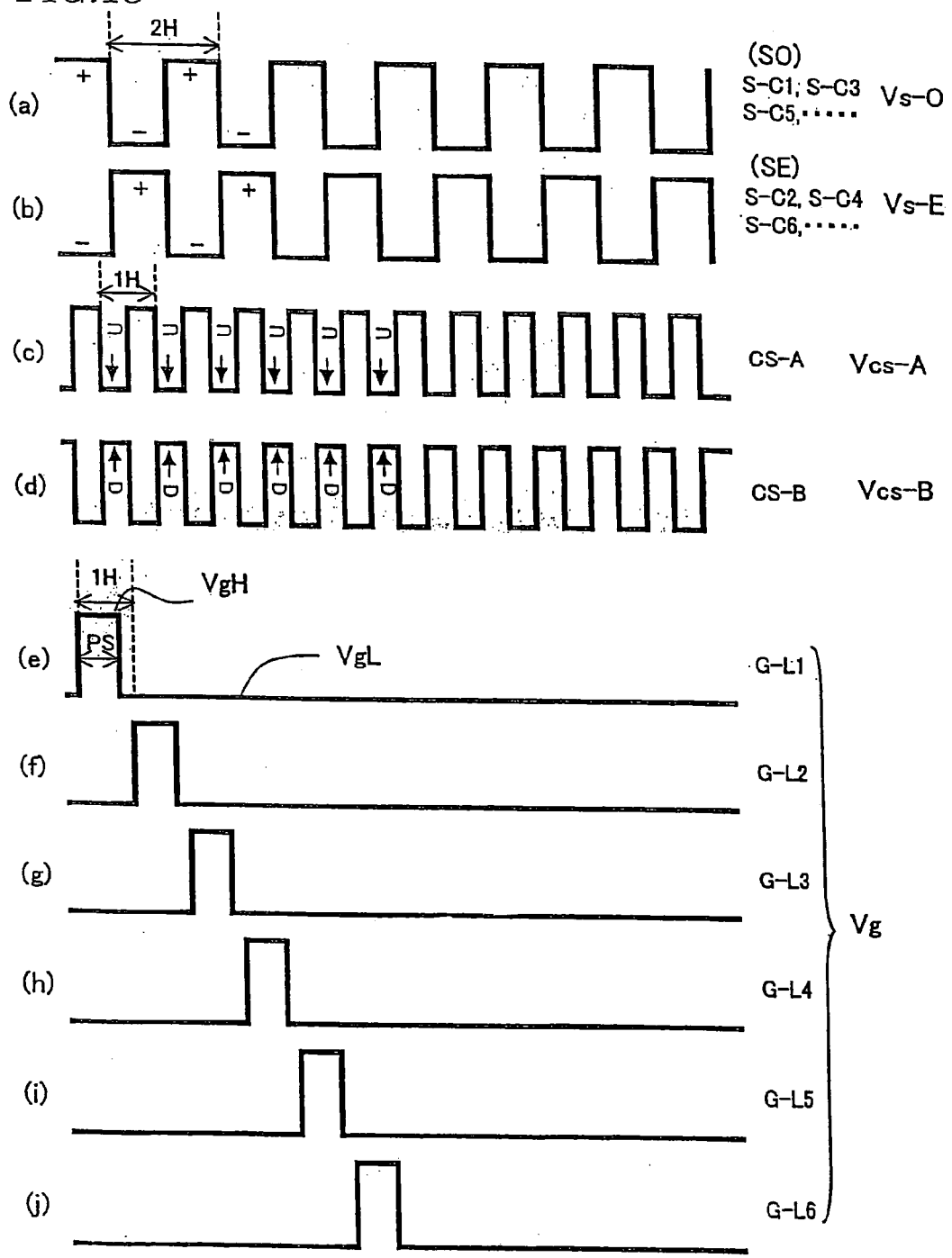
FIG. 18 is a diagram showing waveforms (a)–(j) of various voltages (signals) for driving the liquid crystal display which has the configuration shown in FIG. 17.

FIG. 18 shows the waveforms (a)–(j) of various voltages (signals) used to drive a liquid crystal display with the configuration shown in FIG. 17. By driving the liquid crystal display which has the configuration shown in FIG. 17 with voltages which have the voltage waveforms (a)–(j) shown FIG. 18, it is possible to satisfy the four conditions described above.

Next, description will be given of how the liquid crystal display according to this embodiment satisfies the four conditions described above. For the simplicity of explanation, it is assumed that all pixels are displaying an intermediate grayscale.

In FIG. 18, the waveform (a) is display signal voltage waveforms (source signal voltage waveforms) supplied to the signal lines S-C1, S-C3, S-C5, . . . (a group of odd-numbered signal lines are sometimes referred to as S-O); the waveform (b) is display signal voltage waveforms supplied to the signal lines S-C2, S-C4, S-C6, . . . (a group of even-numbered signal lines are sometimes referred to as S-E); the waveform (c) is a storage capacitor counter voltage waveform supplied to the storage capacitor line CS-A; the waveform (d) is a storage capacitor counter voltage waveform supplied to CS-B; the waveform (e) is a scan voltage waveform supplied to the scan line G-L1; the waveform (f) is a scan voltage waveform supplied to the scan line G-L2; the waveform (g) is a scan voltage waveform supplied to the scan line G-L3; the waveform (h) is a scan voltage waveform supplied to the scan line G-L4; the waveform (i) is a scan voltage waveform supplied to the scan line G-L5; and the waveform (j) is a scan voltage waveform supplied to the scan line G-L6. The period between the time when the voltage of a scan line changes from a low level (VgL) to a high level (VgH) and the time when the voltage of the next scan line changes from VgL to VgH constitutes one horizontal scanning period (1 H). The period during which the voltage of a scan line remains at a high level (VgH) is sometimes referred to as a selection period PS.

Since all pixels are displaying an intermediate grayscale, all display signal voltages (waveforms (a) and (b) in FIG. 18) have oscillating waveforms of fixed amplitude. Also, the oscillation period of the display signal voltages is two horizontal scanning periods (2 H). The reason why the display signal voltages are oscillating and the voltage waveforms of the signal lines S-O (S-C1, S-C3, . . . ) and voltage waveforms of the signal lines S-E (S-C2, S-C4, . . . ) are 180 degrees out of phase is to satisfy the third condition above. Generally, in TFT driving, signal line voltages transmitted to a pixel electrode via TFT elements are affected by changes in scan voltage waveforms (sometimes called a drawing phenomenon). Considering the drawing phenomenon, the counter voltage is positioned approximately at the center of the signal line voltage waveform after the latter is transmitted to the pixel electrode. In FIG. 18, where the pixel electrode voltage waveform is higher than counter voltage, the signal voltage is indicated by a "+" sign and where the pixel electrode voltage waveform is lower than counter voltage, the signal voltage is indicated by a "−" sign. The "+" and "−" signs correspond to the directions of the electric field applied to the liquid crystal layers. The directions of the electric field are opposite between when the sign is "+" and when it is "−".

As described above with reference to FIGS. 12 to 15, when the scan voltage of a scan line is VgH, the TFT connected to the scan line is turned on, causing the display signal voltage to be supplied to the sub-pixel connected to the TFT. Then, when the scan voltage of the scan line becomes VgL, the storage capacitor counter voltage changes. Since the changes (including the direction and sign of the changes) of the storage capacitor counter voltage differ between the two sub-pixels, so do the root-mean-square voltages applied to the sub-pixels.

In the example shown in FIG. 18, both oscillation amplitudes and periods of the storage capacitor counter voltages (waveforms (c) and (d)) take the same values between the storage capacitor lines CS-A and CS-B: for example, twice Vad (see FIG. 14) and 1 H, respectively. Also, the oscillating waveforms of CS-A and CS-B will overlap if one of them is phase-shifted 180 degrees. That is, they are 0.5 H out of phase with each other. An average voltage of each sub-pixel electrode is higher than the display signal voltage of the corresponding signal line existing during the period when the corresponding scan line is in VgH state if the first voltage change of the corresponding storage capacitor line after the voltage of the corresponding scan line changes from VgH to VgL is an increase, but it is lower than the display signal voltage of the corresponding signal line existing during the period when the corresponding scan line is in VgH state if the first voltage change of the corresponding storage capacitor line is a decrease.

Consequently, if the display signal voltage (waveform (a) or (b)) in FIG. 18 is marked by a "+" sign, the root-mean-square voltage applied to the liquid crystal layer is higher when the voltage change of the storage capacitor line is on the rise than when it is on the decline. On the other hand, if the display signal voltage (waveform (a) or (b)) in FIG. 18 is marked by a "−" sign, the root-mean-square voltage applied to the liquid crystal layer is lower when the voltage change of the storage capacitor line is on the rise than when it is on the decline.

FIG. 17 shows states of the pixels P (p, q) and sub-pixels SPa (p, q) and SPb (p, q) in a vertical scanning period (frame period, in this example). The following three symbols shown symmetrically with respect to the scan line of each sub-pixel indicate states of the sub-pixel.

The first symbol H or L indicates the magnitude relationship of the root-mean-square voltage applied to the sub-pixel, where the symbol H means that the applied root-mean-square voltage is high while the symbol L means that the applied root-mean-square voltage is low. The second symbol "+" or "−" indicates the magnitude relationship of voltages between the counter electrode and sub-pixel electrode. In other words, it indicates the directions of the electric field applied to the liquid crystal layer. The symbol "+" means that the voltage of the sub-pixel electrode is higher than the voltage of the counter electrode while the symbol "−" means the voltage of the sub-pixel electrode is lower than the voltage of the counter electrode. The third symbol A or B indicates whether the appropriate storage capacitor line is CS-A or CS-B.

Look at the states of sub-pixels SPa (1, 1) and SPb (1, 1) of the pixel P (1, 1), for example. As can be seen from the waveforms (a) to (e) shown in FIG. 18, during the period when GL-1 is selected (period PS in which the scan voltage is VgH), the display signal voltage is "+." When the scan voltage of GL-1 changes from VgH to VgL, the voltages of the storage capacitor lines of respective sub-pixels (waveforms (c) and (d)) are in the states indicated by the arrows (the first arrows from the left) shown in FIG. 18. Thus, after the scan voltage of GL-1 changes from VgH to VgL, the first voltage change of the storage capacitor counter voltage of SPa (1, 1) is an increase (indicated by "U" in the waveform (c)) as shown in FIG. 18. On the other hand, after the scan voltage of GL-1 changes from VgH to VgL, the first voltage change of the storage capacitor counter voltage of SPb (1, 1) is a decrease (indicated by "D" in the waveform (d)) as shown in FIG. 18. Therefore, the root-mean-square voltage of SPa (1, 1) increases while the root-mean-square voltage of SPb (1, 1) decreases. Hence, the applied root-mean-square voltage of SPa (1, 1) is higher than that of SPb (1, 1), and a symbol H is attached to SPa (1, 1) and a symbol L is attached to SPb (1, 1).

According to the waveform (b) shown in FIG. 18, during the period when GL-1 is selected, the display signal voltages for SPa (1, 2) and SPb (1, 2) of P (1, 2) is When the scan voltage of GL-1 changes from VgH to VgL, the voltages of the storage capacitor lines of respective sub-pixels (waveforms (c) and (d)) are in the states indicated by the arrows (the first arrows from the left) shown in FIG. 18. Thus, after the scan voltage of GL-1 changes from VgH to VgL, the first voltage change of the storage capacitor counter voltage of SPa (1, 2) is an increase ("U") as shown in FIG. 18. On the other hand, after the scan voltage of GL-1 changes from VgH to VgL, the first voltage change of the storage capacitor counter voltage of SPb (1, 2) is a decrease ("D") as shown in FIG. 18. Therefore, the root-mean-square voltage of SPa (1, 2) decreases while the root-mean-square voltage of SPb (1, 2) increases. Hence, the applied root-mean-square voltage of SPa (1, 2) is lower than that of SPb (1, 2), and a symbol L is attached to SPa (1, 2) and a symbol H is attached to SPb (1, 2).

According to the waveform (a) shown in FIG. 18, during the period when GL-2 is selected, the display signal voltages for (2, 1) and SPb (2, 1) of P (2, 1) is "−". When the scan voltage of GL-2 changes from VgH to VgL, the voltages of the storage capacitor lines of respective sub-pixels (waveforms (c) and (d)) are in the states indicated by the arrows (the second arrows from the left) shown in FIG. 18. Thus, after the scan voltage of GL-2 changes from VgH to VgL, the first voltage change of the storage capacitor counter voltage of SPa (2, 1) is a decrease ("D") as shown in FIG. 18D. On the other hand, after the scan voltage of GL-2 changes from VgH to VgL, the first voltage change of the storage capacitor counter voltage of SPb (2, 1) is an increase ("U") as shown in FIG. 18C. Therefore, the root-mean-square voltage of SPa (2, 1) increases while the root-mean-square voltage of SPb (2, 1) decreases. Hence, the applied root-mean-square voltage of SPa (2, 1) is higher than that of SPb (2, 1), and a symbol H is attached to SPa (2, 1) and a symbol L is attached to SPb (2, 1). The states shown in FIG. 17 are brought about in this way.

The liquid crystal display according to this embodiment can be driven in such a way as to satisfy the first condition.

Since FIGS. 17 and 18 show states in a frame period, it is not possible to assess from the figures whether the first condition is satisfied. However, by shifting the phase of the voltage waveform on each signal line (S-O (FIG. 18A) or S-E (FIG. 18B)) by 180 degrees from frame to frame, for example, in FIG. 18, it is possible to implement ac driving where the direction of the electric field applied to each liquid crystal layer is reversed every frame period.

Furthermore, in the liquid crystal display according to this embodiment, to prevent the magnitude relationship of the sub-pixels of the pixels, i.e., the order of brightness of the sub-pixels in a display screen (relative positions of "H" and "L" in FIG. 17) from being changed from frame to frame, the phase of the voltage waveforms on the storage capacitor lines CS-A and CS-B is changed by 180 degrees as the phase of the voltage waveforms on the signal lines is changed. Consequently, the "+" signs and "−" signs shown in FIG. 17 are inverted in the next frame (for example, (+, H) ⇔(−, H), and (+, L) ⇔(−, L). The first condition described above can be satisfied in this way.

Now, we will examine whether the second condition is satisfied, i.e., whether the liquid crystal layer of each sub-pixel (storage capacitor of the sub-pixel) is charged to the same level in different field directions. In the liquid crystal display according to this embodiment, where different root-mean-square voltages are applied to the liquid crystal layers of the sub-pixels in each pixel, display quality such as flickering is decisively influenced by sub-pixels ranked high in brightness, i.e., the sub-pixels indicated by the symbol "H" in FIG. 17. Thus, the second condition is imposed especially on the sub-pixels indicated by the symbol "H."

The second condition will be described with reference to voltage waveforms shown in FIG. 18.

The liquid crystal capacitor and storage capacitor of sub-pixels are charged during the period when the voltage of the corresponding scan line is VgH (selection period PS). The quantity of electric charge stored in the liquid crystal capacitor depends on the voltage difference between the display signal voltage of the signal line and counter voltage (not shown in FIG. 18) during the selection period while the quantity of electric charge stored in the storage capacitor depends on the voltage difference between the display signal voltage of the signal line and voltage of the storage capacitor line (storage capacitor counter voltage) during the selection period.

As shown in FIG. 18, the display signal voltage in each selection period can be one of the two types indicated by the "+" or "−" sign in the figures. In either case, there is no voltage change during each selection period. Regarding the counter voltage (not shown), the same DC voltage which does not vary with time is applied to all the sub-pixels.

There are two types of storage capacitor line CS-A and CS-B. The voltage waveform of CS-A is the same during the selection period of any scan line. Similarly, the voltage waveform of CS-B is the same during the selection period of any scan line. In other words, the DC component (DC level) of the voltage of the storage capacitor lines takes the same value during the selection period of any scan line.

Thus, it is possible to satisfy the second condition by adjusting the DC components (DC levels) of the following voltages as required: display signal voltage of each scan line, voltage of the counter electrode, and voltage of each storage capacitor line.

Next, we will verify whether the third condition is satisfied, i.e., whether pixels opposite in field direction are placed next to each other in each frame period. In the liquid crystal display according to this embodiment, where different root-mean-square voltages are applied to the liquid crystal layers of sub-pixels in each pixel, the third condition applies to the relationship between the sub-pixels which are supplied with the same root-mean-square voltage as well as to the pixels. It is especially important that the third condition be satisfied by the sub-pixels ranked high in brightness, i.e., the sub-pixels indicated by the symbol "H" in FIG. 17, as is the case with the second condition.

As shown in FIG. 17, the "+" and "−" symbols which indicate the polarities (directions of the electric field) of each pixel invert every two pixels (two columns) in the row direction (horizontal direction) such as (+, −), (+, −), (+, −), and every two pixels (two rows) in the column direction (vertical direction) such as (+, −), (+, −), (+, −), (+, −) Viewed on a pixel-by-pixel basis, they exhibit a state called dot inversion, satisfying the third condition.

Next, we will look at the sub-pixels ranked high in brightness, i.e., the sub-pixels indicated by the symbol "H" in FIG. 17.

Referring to FIG. 17, there is no polarity inversion in the row direction as shown, for example, by +H, +H, +H for the sub-pixels SPa in the first row, but the polarity is inverted every two pixels (two rows) in the column direction as shown, for example, by (+H, −H), (+H, −H), (+H, −H), (+H, −H) in the first column. The state known as line inversion can be observed at the level of the particularly important sub-pixels ranked high in brightness, which means that they satisfy the third condition. The sub-pixels indicated by the symbol L are also arranged in a regular pattern, satisfying the third condition.

Next, we will discuss the fourth condition. The fourth condition requires that sub-pixels equal in brightness should not be placed next to each other among the sub-pixels which are intentionally made to vary in brightness.

According to this embodiment, the sub-pixels which are intentionally made to vary in brightness, i.e., the sub-pixels which have different root-mean-square voltages applied to their liquid crystal layers intentionally are indicated by the symbol "H" or "L" in FIG. 17.

In FIG. 17, if sub-pixels are organized into groups of four consisting of two sub-pixels in the row direction and two sub-pixels in the column direction (e.g., SPa (1, 1), SPb (1, 1), SPa (1, 2), and SPb (1, 2)), the entire matrix is made up of the sub-pixel groups in each of which H and L are arranged from left to right in the upper row and L and H are arranged in the lower row. Thus, in FIG. 17, the symbols "H" and "L" are arranged in a checkered pattern at the sub-pixel level, satisfying the fourth condition.

Looking at the matrix, at the pixel level, the correspondence between the order of brightness of the sub-pixels in each pixel and position of the sub-pixels arranged in the column direction changes in the row direction periodically (every pixel) in the case of a pixel in an arbitrary row, but it is constant in the case of a pixel in an arbitrary column. Thus, in a pixel P (p, q) in an arbitrary row, the brightest sub-pixel (sub-pixel indicated by "H," in this example) is SPa (p, q) when q is an odd number, and SPb (p, q) when q is an even number. Of course, conversely, the brightest sub-pixel may be SPb (p, q) when q is an odd number, and SPa (p, q) when q is an even number. On the other hand, in a pixel P (p, q) in an arbitrary column, the brightest sub-pixel is always SPa (p, q) or SPb (p, q) in the same column regardless of whether p is an odd number or even number. The alternative of SPa (p, q) or SPb (p, q) here means that the brightest sub-pixel is SPa (p, q) in an odd-numbered column regardless of whether p is an odd number or even number while it is SPb (p, q) in an even-numbered column regardless of whether p is an odd number or even number.

As described above with reference to FIGS. 17 and 18, the liquid crystal display according to this embodiment satisfies the four conditions described above, and thus it can implement high quality display.

Figure 19:
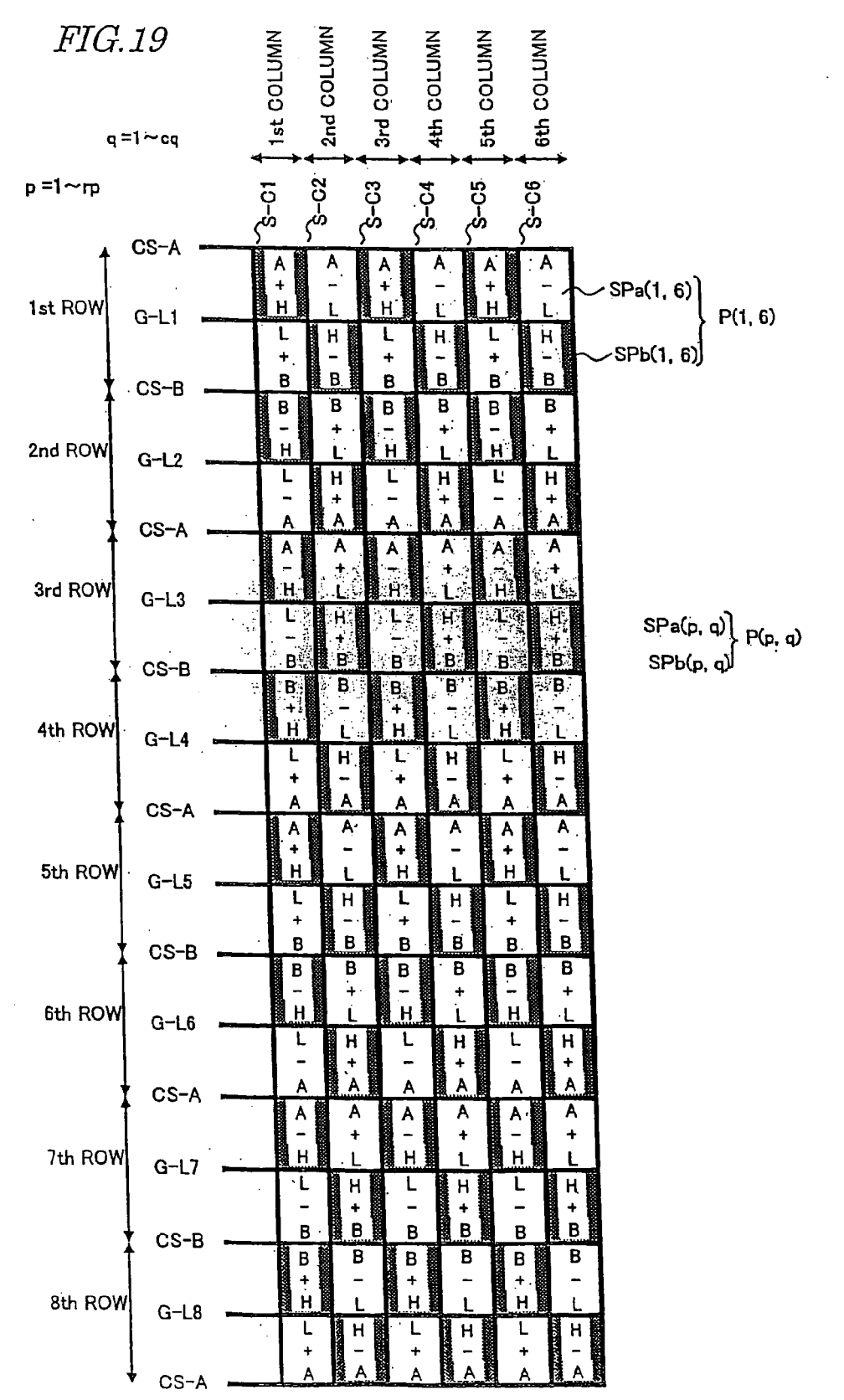
Figure 20:
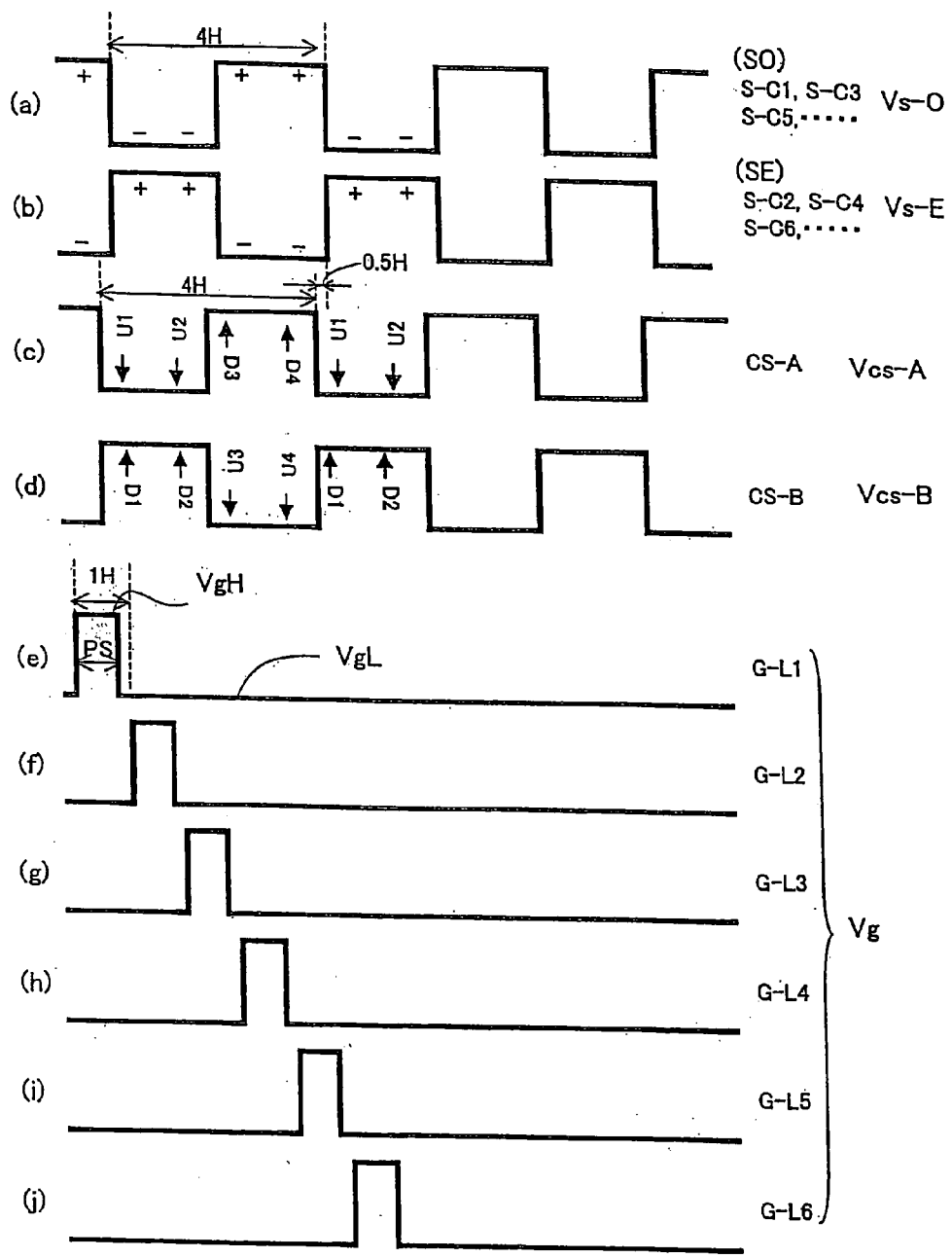
FIG. 20 is a diagram showing waveforms (a)–(j) of various voltages (signals) for driving the liquid crystal display which has the configuration shown in FIG. 19.

Next, a liquid crystal display according to another embodiment using a different drive method for pixels and sub-pixels will be described with reference to FIGS. 19 and 20. FIG. 19 and FIG. 20 correspond to FIG. 17 and FIG. 18.

As shown in FIG. 20, in the liquid crystal display according to this embodiment, display signal voltage and storage capacitor counter voltage oscillate every 2 H. Thus the period of oscillation is 4 H (four horizontal write times). The oscillations of the signal voltages of odd-numbered signal lines S-O (S-C1, S-C3, S-C5, . . . ) and even-numbered signal lines S-E (S-C2, S-C4, S-C6, . . . ) are 180 degrees (2 H in terms of time) out of phase with each other. The oscillations of the voltages of the storage capacitor lines CS-A and CS-B are also 180 degrees (2H in terms of time)

out of phase with each other. Furthermore, the oscillation of the voltage of the signal lines lags the oscillation of the voltage of the storage capacitor line CS-A by a phase difference of 45 degrees (⅛ period, i.e., H/2). Incidentally, the phase difference of 45 degrees is used to prevent the VgH-to-VgL voltage change of the scan line and the voltage change of the storage capacitor line from overlapping, and the value used here is not restrictive and another value may be used as required.

With the liquid crystal display according to this embodiment, again every pixel consists of two sub-pixels which are intentionally made to vary in brightness and are indicated by the symbol "H" or "L." Furthermore, as shown in FIG. 19, the sub-pixels indicated by the symbol "H" or "L" are arranged in a checkered pattern, which means that the fourth condition is satisfied, as with the above embodiment. Regarding the first condition, it can be satisfied using the same inversion method as the one used by the embodiment described with reference to FIGS. 17 and 18.

However, the embodiment shown in FIGS. 19 and 20 cannot satisfy the second condition described above.

Now, we will look at the brighter sub-pixels Pa (1, 1), Pa (2, 1), Pa (3, 1), and Pa (4, 1) of the pixels P (1, 1), P (2, 1), P (3, 1), and P (4, 1) shown in the first to fourth rows of the first column in FIG. 19. When Pa (1, 1) is being charged, i.e., when G-GL1 is selected, the polarity symbol of the corresponding signal line is "+.". When Pa (3, 1) is being charged, i.e., when G-GL3 is selected, the polarity symbol of the corresponding signal line is "−". Also, when Pa (1, 1) is being charged, i.e., when G-GL1 is selected, the voltage waveform of the corresponding storage capacitor line CS-A decreases stepwise beginning at approximately the center of the selection period. When Pa (3, 1) is being charged, i.e., when G-GL3 is selected, the voltage waveform of the corresponding storage capacitor line CS-A increases stepwise beginning at approximately the center of the selection period. Thus, by controlling the phases of the signal voltage waveforms of both storage capacitor line CS-B and scan line precisely, it is possible to make the storage capacitor counter electrode have the same DC level both when Pa (1, 1) is being charged and when Pa (3, 1) is being charged. By setting the DC level to the average between the voltage (equal to the voltage of the sub-pixel electrode) of the storage capacitor counter electrode when Pa (1, 1) is being charged and the voltage (equal to the voltage of the sub-pixel electrode) of the storage capacitor counter electrode when Pa (3, 1) is being charged, it is possible to equate the quantities of electric charge stored in the storage capacitors of Pa (1, 1) and Pa (3, 1). Next, looking at Pa (2, 1), during the corresponding period, i.e., when G-L2 is selected, the polarity symbol of the corresponding signal line is "−" (the same as with Pa (3, 1) described above) and the voltage of the corresponding storage capacitor line takes a fixed value (not an oscillating waveform such as those above) regardless of time. Thus, by equating the voltage value of the storage capacitor line corresponding to Pa (2, 1) and the DC level described above in relation to Pa (1, 1) and Pa (3, 1), it is possible to equate the quantities of electric charge stored in the storage capacitors of Pa (1, 1), Pa (3, 1), and Pa (2, 1). However, it is impossible to equate the quantities of electric charge stored in the storage capacitor Pa (4, 1) with those in the storage capacitors of Pa (1, 1), Pa (2, 1), and Pa (3, 1) for the following reason. The polarity symbol of the signal line for Pa (4, 1) is the same as that for Pa (1, 1) and the voltage of the corresponding storage capacitor line takes a fixed value (not an oscillating waveform such as those above) regardless of time. Thus, it is necessary to equate the voltage value (the fixed value described above) of the storage capacitor line for Pa (4, 1) with the DC level described above in relation to Pa (1, 1) and Pa (3, 1), as in the case of Pa (2, 1), i.e., to equate the voltage value (the fixed value described above) of the storage capacitor line for Pa (4, 1) with that for Pa (2, 1). However, this is not possible because, as can be seen from FIGS. 19 and 20, both the storage capacitor lines for Pa (2, 1) and Pa (4, 1) are CS-B, which has a rectangular oscillating waveform, and the maximum value of the oscillating waveform is selected during the selection period of Pa (2, 1) while the minimum value of the oscillating waveform is selected during the selection period of Pa (4, 1), making the two voltages necessarily different.

Also, in terms of the third condition to arrange the sub-pixels with the same polarity so as not to adjoin each other as much as possible, this embodiment is inferior to the embodiment described with reference to FIGS. 17 and 18.

Referring to FIG. 19, we will look at the polarity inversion of the sub-pixels which have a large voltage applied to their liquid crystal layers intentionally, i.e., the sub-pixels indicated by the symbol H, out of the sub-pixels composing pixels. In FIG. 19, there is no polarity inversion in the row direction as shown, for example, by +H, +H, +H for the sub-pixels SPa in the first row (as with FIG. 17), but the polarity is inverted every four pixels in the column direction as shown, for example, by (+H, −H, −H, +H), (+H, −H, −H, +H) in the first column. In the embodiment described with reference to FIGS. 17 and 18, polarity inversion occurs every two pixels, 1/2 the polarity inversion cycle of this embodiment. In other words, in the embodiment described with reference to FIGS. 17 and 18, polarity inversion occurs twice as frequently as in this embodiment described with reference to FIGS. 19 and 20. In this respect, this embodiment (described with reference to FIGS. 19 and 20) is inferior to the embodiment described with reference to FIGS. 17 and 18.

Display quality was actually compared between the drive method of the previous embodiment which implements the pixel arrangement shown in FIG. 17 and the drive method of this embodiment and differences were observed in the display quality. Specifically, when, for example, a 64/255-grayscale display which produces relatively large brightness differences among sub-pixels which were intentionally made to vary in brightness was observed with the line of sight fixed, no significant difference was observed between the two drive methods. However, when the display was observed by moving the line of sight, horizontal streaks were observed in the case of the drive method of this embodiment (FIG. 19) whereas the drive method of the previous embodiment (FIG. 17) was free of such a problem. It is believed that the difference was caused by the difference in the polarity inversion cycle described above. Since the brighter of the two sub-pixels contained in each pixel is more conspicuous, it is preferable to minimize the polarity inversion cycle of the brighter sub-pixel. Each pixel is divided into two sub-pixels in the example described above, but if it is divided into three or more sub-pixels, it is preferable to arrange them in such a way as to minimize the polarity inversion cycle of the brightest sub-pixel. Needless to say, it is most preferable that all the other sub-pixels have the same polarity inversion cycle as the brightest sub-pixel.

Next, with reference to FIGS. 21A and 21B, description will be given of an embodiment which makes the above-described horizontal streaks more inconspicuous using a shorter polarity inversion cycle than the embodiment shown in FIG. 17 even if the display is observed by moving the line of sight.

According to the embodiment shown in FIG. 17, although the "+" and "−" signs of the brighter sub-pixels (indicated by the symbol "H") composing pixels are inverted in the column direction as shown by (+, −), (+, −), (+, −), (+, −), they are not inverted in the row direction as shown by +, +, +, +, +, + or −, −, −, −, −, −. In contrast, according to the embodiment shown in FIG. 21, the "+" and "−" signs of the brighter sub-pixels are inverted not only in the column direction as shown by (+, −), (+, −), (+, −), (+, −), but also in the row direction as shown by (+, −), (+, −). Thus, this embodiment shown in FIG. 20 uses a shorter polarity inversion cycle than the embodiment shown in FIG. 17. In this respect, this embodiment shown in FIG. 20 is more preferable than the embodiment shown in FIG. 17.

Even in the embodiment shown in FIG. 21, out of the sub-pixels composing the pixels, the brighter sub-pixels indicated by the symbol "H" are arranged in a checkered pattern, satisfying the fourth condition.

The pixel arrangement shown in FIG. 21A can be implemented, for example, as follows.

Figures 21A, 21B:
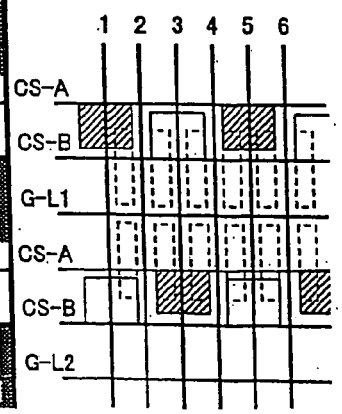
FIG. 21A is a diagram schematically showing a pixel arrangement of a liquid crystal display according to another embodiment of the present invention and FIG. 21B is a diagram schematically showing an arrangement of its storage capacitor lines and storage capacitor electrodes.

As shown schematically in FIG. 21B, the storage capacitor counter electrodes for the sub-pixels in each row are connected alternately to the storage capacitor line CS-A or CS-B every two columns. This structural change can be seen clearly by comparing FIG. 21 for this embodiment and FIG. 17 or 18 for the embodiment described earlier. Specifically, this can be seen by looking at the storage capacitor lines selected at the sub-pixel in the row direction. For example, in the row of sub-pixels SPa (1, 1) to SPa (1, 6), out of the storage capacitor counter electrodes indicated by the symbol "A" or "B," "A" is selected for SPa (1, 1), "B" for SPa (1, 2) and SPa (1, 2), "A" for SPa (1, 4) and SPa (1, 5), and "B" for SPa (1, 6) in FIG. 21 (this embodiment) whereas "A" is selected for all the sub-pixels SPa (1, 1) to SPa (1, 6) in FIG. 17 or 18 (the embodiment described earlier).

The voltage waveforms (a)–(j) shown in FIG. 18 can be used as the voltage waveforms supplied to the lines, including the storage capacitor lines CS-A and CS-B, according to this embodiment shown in FIG. 21. However, since display signal voltages are inverted every two columns, the display signal voltages having the waveform (a) shown in FIG. 18 are supplied to S-C1, S-C2, S-C5, S-C6, . . . shown in FIG. 21A, while the display signal voltages having the waveform (b) shown in FIG. 20 are supplied to S-C3, S-C4, S-C7 (not shown), S-C8 (not shown), . . . in FIG. 21A.

Although in the embodiments described above, the storage capacitor counter voltages supplied to the storage capacitor lines are oscillating voltages which have rectangular waveforms with a duty ratio of 1:1, the present invention can also use rectangular waves with a duty ratio of other than 1:1. Besides other waveforms such as sine waves or triangular waves may also be used. In that case, when TFTs connected to a plurality of sub-pixels are turned off, the changes which occur in the voltages supplied to the storage capacitor counter electrodes of sub-pixels can be varied depending on the sub-pixels. However, the use of rectangular waves makes it easy to equate quantities of electric charge stored in different sub-pixels (liquid crystal capacitors and storage capacitors) as well as root-mean-square voltages applied to different sub-pixels.

Also, although in the embodiments described above with reference to FIGS. 17 and 21, the oscillation period of the oscillating voltages supplied to the storage capacitor lines (waveforms (c) and (d)) are 1 H as shown in FIG. 18, it may be a fraction of 1 H, such as ½ H, ½ H, ⅓ H, ¼ H, etc., obtained by dividing 1 H by a natural number. However, as the oscillation period of the oscillating voltages becomes shorter, it becomes difficult to build drive circuits or power consumption of the drive circuits increases.

As described above, the first aspect of the present invention can reduce the viewing angle dependence of γ characteristics in a normally black liquid crystal display. In particular, it can achieve extremely high display quality by improving γ characteristics of liquid crystal displays with a wide viewing angle such as MVA or ASV liquid crystal displays.

The second aspect of the present invention can reduce flickering on a liquid crystal display driven by alternating voltage. By combining the first and second aspects of the present invention it is possible to provide a normally black liquid crystal display with reduced flickering, improved viewing angle characteristics, and high quality display.

What is claimed is:

1. A liquid crystal display used in normally black mode, comprising a plurality of pixels each of which has a liquid crystal layer and a plurality of electrodes for applying voltage to the liquid crystal layer, wherein:

each of the plurality of pixels comprises a first sub-pixel and a second sub-pixel which can apply mutually different voltages to their respective liquid crystal layers; and when each of the plurality of pixels displays a grayscale gk which satisfies $0 \leq gk \leq n$, where gk and n are integers not less than zero and a larger value of gk corresponds to higher brightness, n represents the highest grayscale, and at least the range of $0 < gk \leq n-1$ includes gk which satisfies relationships $\Delta V12\ (gk) > 0$ volts and $\Delta V12\ (gk) \geq \Delta V12\ (gk+1)$ if it is assumed that $\Delta V12\ (gk) = V1\ (gk) - V2\ (gk)$, where V1 (gk) and V2 (gk) are root-mean-square voltages applied to the liquid crystal layers of the first sub-pixel and the second sub-pixel, respectively.

2. The liquid crystal display according to claim 1, wherein:

each of the plurality of pixels comprises a third sub-pixel which can apply a voltage different from those of the first sub-pixel and the second sub-pixel to its liquid crystal layer; and when each of the plurality of pixels displays a grayscale gk, a relationship 0 volts $< \Delta V13\ (gk) < \Delta V12\ (gk)$ is satisfied if the root-mean-square voltage applied to the liquid crystal layer of the third sub-pixel is V3 (gk) and $\Delta V13\ (gk) = V1\ (gk) - V3\ (gk)$.

3. The liquid crystal display according to claim 1, wherein a relationship $\Delta V12\ (gk) \geq \Delta V12\ (gk+1)$ is satisfied at least in a range $0 < gk \leq n-1$.

4. The liquid crystal display according to claim 2, wherein a relationship $\Delta V13\ (gk) \geq \Delta V13\ (gk+1)$ is satisfied at least in a range $0 < gk \leq n-1$.

5. The liquid crystal display according to claim 1, wherein:

the first sub-pixel and the second sub-pixel each comprise:

a liquid crystal capacitor formed by a counter electrode and a sub-pixel electrode opposing the counter electrode via the liquid crystal layer, and a storage capacitor formed by a storage capacitor electrode connected electrically to the sub-pixel electrode, an insulating layer, and a storage capacitor counter electrode opposing the storage capacitor electrode via the insulating layer; and the counter electrode is a single electrode shared by the first sub-pixel and the second sub-pixel, and the storage capacitor counter electrodes of the first sub-pixel and the second sub-pixel are electrically independent of each other.

6. The liquid crystal display according to claim 5, comprising two switching elements provided for the first sub-pixel and the second sub-pixel, respectively,
wherein the two switching elements are turned on and off by scan line signal voltages supplied to a common scan line; display signal voltages are applied to the respective sub-pixel electrodes and storage capacitor electrodes of the first sub-pixel and the second sub-pixel from a common signal line when the two switching elements are on; voltages of the respective storage capacitor counter electrodes of the first sub-pixel and the second sub-pixel change after the two switching elements are turned off; and the amounts of change defined by the direction and magnitude of the change differ between the first sub-pixel and the second sub-pixel.

7. The liquid crystal display according to claim 6, wherein the liquid crystal layer is a vertically aligned liquid crystal layer and contains nematic liquid crystal material with negative dielectric anisotropy.

8. The liquid crystal display according to claim 7, wherein the liquid crystal layers of the first sub-pixel and the second sub-pixel each contain four domains which are approximately 90 degrees apart in azimuth direction in which their liquid crystal molecules incline when a voltage is applied.

9. The liquid crystal display according to claim 8, wherein:
the first sub-pixel and the second sub-pixel are placed on opposite sides of the common signal line;
the first sub-pixel and the second sub-pixel each have, on the counter electrode side, a plurality of ribs protruding towards the liquid crystal layer and the plurality of ribs include a first rib extending in a first direction and a second rib extending in a second direction approximately orthogonal to the first direction; and
the first rib and the second rib are placed symmetrically with respect to a center line parallel to the common scan line in each of the first sub-pixel and the second sub-pixel and the arrangement of the first rib and the second rib in one of the first and second sub-pixels is symmetrical with respect to the arrangement of the first rib and the second rib in the other sub-pixel.

10. The liquid crystal display according to claim 9, wherein the areas of the first sub-pixel and the second sub-pixel are practically equal and the center line parallel to the common scan line in each of the first sub-pixel and the second sub-pixel is placed at an interval equal to approximately one half of an array pitch of the scan lines in both the first sub-pixel and the second sub-pixel.

11. The liquid crystal display according to claim 1, wherein the area of the first sub-pixel is equal to or smaller than the area of the second sub-pixel.

\* \* \* \* \*